(12) United States Patent
Berson

(10) Patent No.: US 11,267,734 B2
(45) Date of Patent: Mar. 8, 2022

(54) APPARATUS AND PROCESS FOR WATER TREATMENT

(71) Applicant: Barbara Berson, Kleve (DE)

(72) Inventor: Barbara Berson, Kleve (DE)

( * ) Notice: Subject to any disclaimer, the term of this patent is extended or adjusted under 35 U.S.C. 154(b) by 69 days.

(21) Appl. No.: 16/624,757

(22) PCT Filed: Jun. 27, 2018

(86) PCT No.: PCT/EP2018/067292
§ 371 (c)(1),
(2) Date: Dec. 19, 2019

(87) PCT Pub. No.: WO2019/002389
PCT Pub. Date: Jan. 3, 2019

(65) Prior Publication Data
US 2021/0139357 A1    May 13, 2021

(30) Foreign Application Priority Data
Jun. 27, 2017    (DE) ...................... 10 2017 114 186.3

(51) Int. Cl.
*C02F 1/78*    (2006.01)
*C02F 1/00*    (2006.01)
(Continued)

(52) U.S. Cl.
CPC .............. *C02F 1/78* (2013.01); *C02F 1/004* (2013.01); *C02F 1/325* (2013.01); *C02F 1/722* (2013.01);
(Continued)

(58) Field of Classification Search
CPC ...... C02F 1/32; C02F 1/48; C02F 1/72; C02F 1/325; B01D 32/34
See application file for complete search history.

(56) References Cited

U.S. PATENT DOCUMENTS

2012/0261349 A1* 10/2012 Kolstad .................... C02F 9/00
                                                              210/695

FOREIGN PATENT DOCUMENTS

DE    10040566 A1    3/2002
DE    10129663 A1    1/2003
(Continued)

OTHER PUBLICATIONS

Berson, B.: Das zukunftsweisende UVOX-Vertahren (The trend-setting UVOX-process) In: Koi Kurier 52 (2007), 2, 118-121.
(Continued)

*Primary Examiner* — Walter D. Griffin
*Assistant Examiner* — Cameron J Allen
(74) *Attorney, Agent, or Firm* — Ballard Spahr LLP

(57) ABSTRACT

Disclosed are a water treatment apparatus and a process for treating process water with ozone and ultraviolet radiation. The apparatus comprises a reactor (4) having a first (5) and a second (6) reaction chamber. The first reaction chamber (5) has a UV lamp (1), an air inlet (30) and a gas outlet (23). An air/ozone conduit (34) is connected to the gas outlet (23), via which an air/ozone mixture (b) can be fed into a water inlet conduit (31). The second reaction chamber (6) is connected to the water inlet conduit (31) and a water outlet conduit (32). The inlet conduit (31) may contain a water filter (18) as well as a controllable circulation pump (16) designed to pump water in the reactor direction. The water filter (18) may be arranged between the circulation pump (16) and the reactor (4). A recirculation conduit (33) comprises a pump (10) pumping water towards the inlet conduit (31). It has a feed point (21) at which the air/ozone mixture (b) is feedable into the process water (d) or is in fluid communication with a fresh water conduit (35) via a fresh water feed point (9), which has a feed point (21) at which the air/ozone mixture
(Continued)

(b) is feedable into fresh water (f) in the fresh water conduit (35).

20 Claims, 9 Drawing Sheets

(51) Int. Cl.
*C02F 1/32* (2006.01)
*C02F 1/72* (2006.01)
*C02F 103/00* (2006.01)
*C02F 103/42* (2006.01)

(52) U.S. Cl.
CPC .... *C02F 2103/007* (2013.01); *C02F 2103/42* (2013.01); *C02F 2201/003* (2013.01); *C02F 2201/3223* (2013.01); *C02F 2201/782* (2013.01); *C02F 2209/02* (2013.01); *C02F 2209/03* (2013.01); *C02F 2209/38* (2013.01); *C02F 2209/40* (2013.01); *C02F 2301/043* (2013.01); *C02F 2301/046* (2013.01); *C02F 2303/04* (2013.01); *C02F 2303/22* (2013.01); *C02F 2305/023* (2013.01)

(56) References Cited

FOREIGN PATENT DOCUMENTS

| | | |
|---|---|---|
| EP | 2165978 A1 | 3/2010 |
| EP | 2289854 A2 | 3/2011 |
| JP | 2013255862 A | 12/2013 |
| WO | WO-2019/002389 A1 | 1/2019 |

OTHER PUBLICATIONS

LAWA—Federal/State Water Working Group: Micropollutants in water bodies http://www.lawa.de/documents/Uml242016_20160126_LAWA_Bericht_Mikroschadstoffe_in_Gewaessern_final_207.pdf.
International Search Report and Written Opinion dated Sep. 25, 2018 by the International Searching Authority for International Application No. PCT/EP2018/067292, filed on Jun. 27, 2018 and published as WO 2019/002389 on Jan. 3, 2019 (Applicant—Barbara Berson) (Original—12 pages//Translation 3 Pages).

\* cited by examiner

| sample | IT mJ/cm² | UVT | position | colonies (CFU/mL) | log reduction |
|---|---|---|---|---|---|
| swimming pool water (without BFA) | 13 | 96% | inlet | 3.90E+05 | > 5 |
| | | | outlet | 0.00E+00 | |
| | 27 | 96% | inlet | 5.21E+05 | > 5 |
| | | | outlet | 0.00E+00 | |
| | 47 | 96% | inlet | 6.08E+05 | > 5 |
| | | | outlet | 0.00E+00 | |
| swimming pool water (with BFA) | 7 | 87% | inlet | 2.08E+05 | > 5 |
| | | | outlet | 0.00E+00 | |
| | 14 | 90% | inlet | 1.45E+05 | > 5 |
| | | | outlet | 0.00E+00 | |
| | 27 | 93% | inlet | 1.63E+05 | > 5 |
| | | | outlet | 0.00E+00 | |

| sample | UVT | IT (mJ/cm²) | log reduction |
|---|---|---|---|
| UV 1 | 96 % | 14.2 | 1.14 |
| | | 26.2 | 1.30 |
| | | 53.0 | 1.39 |
| UV 2 | 93 % | 8.6 | 0.96 |
| | | 16.3 | 1.23 |
| | | 33.8 | 1.35 |
| UV 3 | 88 % | 5.8 | 0.83 |
| | | 11.1 | 1.15 |
| | | 24.4 | 1.39 |

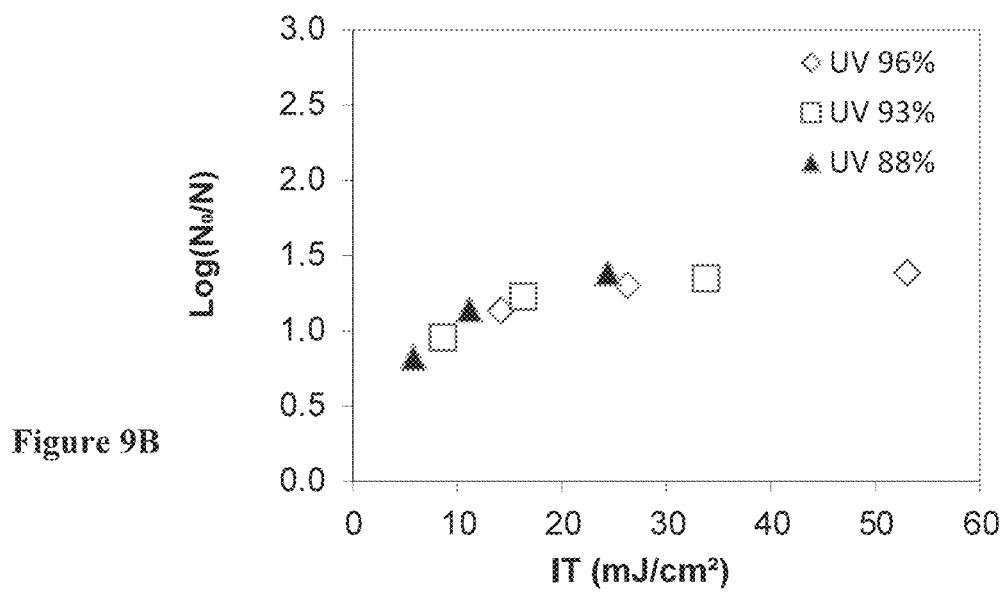
Figure 9B
Figure 10A
| sample | UVT | mJ | Log reduction |
|---|---|---|---|
| apparatus 1 | 96% | 12.2 | 1.68 |
| | | 23.2 | 2.25 |
| | | 44.2 | 2.76 |
| apparatus 2 | 93% | 7.7 | 1.33 |
| | | 14.4 | 2.01 |
| | | 26.9 | 2.44 |
Figure 10B
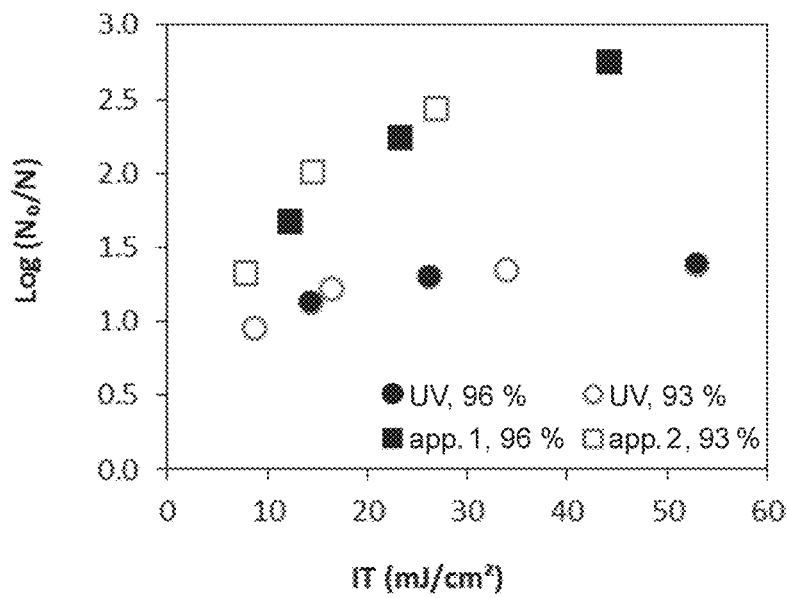

APPARATUS AND PROCESS FOR WATER TREATMENT

CROSS-REFERENCE TO RELATED APPLICATIONS

This is a U.S. national phase application of International Application No. PCT/EP2018/067292, filed Jun. 27, 2018, which claims the benefit of priority to DE Application No. 10 2017 114 186.3, filed on Jun. 27, 2017. The content of these earlier filed applications is hereby incorporated herein by reference in its entirety.

FIELD

Disclosed are an apparatus and a process for water treatment. In particular, there is disclosed an improvement of an apparatus for the treatment of water by means of ultraviolet irradiation with a wavelength of about 254 nanometers and at the same time having a wavelength of about 185 nanometers by means of a single illuminant.

BACKGROUND

Using water, for example in the context of a commercial process or when standing in a basin, involves generating process water which, in comparison to the fresh water or drinking water originally provided, contains much more pollution, being in macroscopic form, in the form of microorganisms and/or in the form of low-molecular weight chemical compounds, in particular organic compounds, but partially also inorganic salts. These compounds are often difficult to degrade biologically or are non-biodegradable. For more than ten years, low molecular weight chemical compounds in water that are difficult or impossible to degrade have been the subject of technical and environmental policy debates both on the national and the international level under the keyword "micropollutants" (see e.g. the Federal/State Working Group Water at http://www.lawa.de/documents/Um124-2016_20160126_LAWA_Bericht_Mikroschad- stoffe_in_Gewaessern_final_207.pdf). The terms "microcontaminants" or "microelements" are also used as synonyms for the term "micropollutants". Some of the organic compounds can have adverse effects on aquatic ecosystems and adversely affect the recovery of drinking water from raw water already at very low concentrations. These compounds include, for example, residuals of biocides and pesticides, human and veterinary drugs, personal care products and household and industrial chemicals. As an illustrative example, when treating a public swimming pool with a depot disinfectant, so-called disinfection by-products (DBPs) are formed, such as mono-, di- and trichloramines, which adversely affect the water quality and even endanger the health of the bather.

Process water, for example water in a pond or swimming pool such as a public swimming pool, is usually purified by means of a filter device and by adding an oxidation agent such as chlorine or hydrogen peroxide.

German patent application DE 101 29 663 discloses a process for the treatment of pre-purified water by means of an ozone-enriched air stream, an activated carbon filter and UV radiation.

An apparatus and a respective process for water treatment, in which UV light and ozone are used, are known from the website www.uvox.com/das-uvox-verfahren.html (Berson, B., Koikurier 52 (2007), 2, 118-121).

The apparatus includes a reactor with two reaction chambers, one for producing an air/ozone mixture which is introduced into the water to be treated, and one for irradiating the water thus treated with UV light. The air/ozone mixture is fed into the process water via an inlet point, for example a Venturi nozzle in a bypass branching of the feed line of the water to be treated. Here it would, however, be desirable to be more independent of pressure fluctuations in the main water circuit with respect to the intake of the air/ozone mixture via the inlet point or the bypass branching that includes an injection nozzle, in order to achieve an intake performance of the air/ozone mixture that is stable and optimal for the application.

In addition, it would be desirable to avoid or minimize deposition and contaminations on the outside of the quartz tube, in order to ensure optimum UV radiation in the second reaction chamber of the reactor at all times.

It would also be desirable to optimize the system hydraulically and energetically in order to minimize the consumption of energy, water and chemicals, and to allow early amortization of the plant.

Furthermore, it would be desirable to be able to at least partially control the operation and maintenance of the apparatus.

SUMMARY

Disclosed is an apparatus for treating water, e.g. water contaminated with microorganisms and water soluble micropollutants, with ozone and ultraviolet radiation, as well as a use of the apparatus in water treatment. Also disclosed is a process of treating water with ozone and ultraviolet radiation. The water to be treated contains or consists of process water.

The water treatment apparatus includes a reactor containing a UV lamp. Connected to the reactor there is an inlet conduit for contaminated water. Furthermore, an outlet conduit for treated, conditioned water is connected to the reactor. The reactor includes a first inner reaction chamber with a UV lamp arranged in the center, and an air inlet. Air passes through the first reaction chamber as it is exposed to ultraviolet radiation from the UV lamp for the formation of ozone. The reactor includes an outlet for the air/ozone mixture to which there is connected an air/ozone conduit. This air-ozone conduit feeds the air-ozone mixture into the inlet conduit for the contaminated water or the water to be treated. The reactor includes a second reaction chamber through which the water to be treated, to be conditioned, flows as it is exposed to ultraviolet radiation from the UV lamp.

In a first aspect, there is provided an apparatus for treating process water with ozone and ultraviolet radiation. The apparatus includes a reactor which contains a first and a second reaction chamber, hereinafter also referred to as a first and a second reactor chamber. The first reaction chamber contains a UV lamp and an air inlet. The first reaction chamber also contains a gas outlet for an air/ozone mixture. The first reaction chamber is capable of allowing air to flow therethrough, while this air is exposable to ultraviolet radiation from the UV lamp for the formation of ozone. An inlet conduit for the process water is connected to the second reaction chamber. An outlet conduit for the treated, conditioned water is also connected to the second reaction chamber. The second reaction chamber is capable of allowing water that is to be treated to flow therethrough, while the water to be treated is exposable to the ultraviolet radiation from the UV lamp. An air/ozone conduit is connected to the gas outlet for the air/ozone mixture, via which the air/ozone mixture is feedable into the inlet conduit for the process water. The inlet conduit is designed for allowing coupling of the same to a water filter and to a circulation pump such that the water filter is arranged between the circulation pump and the reactor. Furthermore, the apparatus contains a recirculation conduit for partially recirculating the treated water from the outlet conduit to the inlet conduit. The recirculation conduit includes a pump configured to pump water towards the inlet conduit. The recirculation conduit either includes, in some embodiments, a feedpoint at which the air/ozone mixture is feedable into the process water, or the recirculation conduit is in fluid communication with a fresh water conduit via a fresh water feed point. In the latter case, the fresh water conduit may include a feed point at which the air-ozone mixture is feedable into the fresh water. In some embodiments, both the recirculation conduit and the fresh water conduit include a feed point at which the air/ozone mixture can be fed in.

In some embodiments, the inlet conduit includes the circulation pump, which is configured to pump water in the direction of the reactor. In some embodiments the inlet conduit includes a water filter. In some embodiments, the inlet conduit includes both the circulation pump and the water filter. The water filter is in this case arranged between the circulation pump and the reactor.

In some embodiments, the apparatus includes a second circulation pump connected in parallel to the circulation pump, which is configured to pump water in the direction of the reactor. The second circulation pump is a controllable circulation pump. The second, controllable circulation pump is arranged upstream of the water filter in a bypass branch of the inlet conduit. A check valve is also arranged between the circulation pump and the water filter. Also between the second, controllable circulation pump and the water filter, there is arranged a check valve.

In a second aspect, there is provided an apparatus for treating process water with ozone and ultraviolet radiation. The apparatus includes a reactor which contains a first and a second reaction chamber, hereinafter also referred to as a first and a second reactor chamber. The first reaction chamber contains a UV lamp and an air inlet. The first reaction chamber also contains a gas outlet for an air/ozone mixture. The first reaction chamber is capable of allowing passage of air therethrough, while this air is exposable to ultraviolet radiation from the UV lamp to form ozone. An inlet conduit for the process water is connected to the second reaction chamber. Furthermore, an outlet conduit for the treated, conditioned water is connected to the second reaction chamber. The second reaction chamber is capable of allowing passage of water to be treated, while the water to be treated is exposable to the ultraviolet radiation from the UV lamp. The inlet conduit includes a water filter. An air/ozone conduit is connected to the gas outlet for the air/ozone mixture, through which the air/ozone mixture is feedable into the inlet conduit for the water to be treated. The inlet conduit contains a first circulation pump configured to pump water in the direction of the reactor. The water filter is arranged between the first circulation pump and the reactor. The apparatus also includes a second circulation pump connected in parallel to the first circulation pump, which is configured to pump water in the direction of the reactor. The second circulating pump is a controllable circulation pump. The second, controllable circulation pump is arranged upstream of the water filter in a bypass branch of the inlet conduit. A check valve is arranged between the first circulation pump and the water filter. Also between the second, controllable circulation pump and the water filter, there is arranged a non-return valve.

In some embodiments, the apparatus according to the second aspect includes a recirculation conduit for partially recirculating treated, conditioned water from the outlet conduit to the inlet conduit. The recirculation conduit contains a pump configured to pump water towards the inlet conduit. In some embodiments, it either contains a feed point at which the air/ozone mixture is feedable into the process water, or the recirculation conduit is in fluid connection with a fresh water conduit via a fresh water feed point. In the latter case, the fresh water conduit contains a feed point at which the air/ozone mixture is feedable into the fresh water. In some embodiments, both the recirculation conduit and the fresh water conduit contain a feed point at which the air/ozone mixture can be fed in.

In some embodiments of the apparatus according to the first or second aspect, the second circulation pump, connected in parallel to the first circulation pump, is a variable-frequency circulation pump. In some embodiments of the apparatus according to the first or the second aspect, the variable-frequency circulation pump is coupled to a controller. In some embodiments, the pump is frequency-controllable in such a manner that its suction capacity for the air/ozone mixture is constant.

In some embodiments of the apparatus according to the first or second aspect, the first circulation pump that is arranged downstream of the water filter is also a controllable circulation pump.

In some embodiments of the apparatus according to the first or second aspect, the recirculation conduit contains a feed point at which the air/ozone mixture is feedable into the process water. In such embodiments, the pump is generally arranged between the connection of the recirculation conduit to the outlet conduit and the feed point for the air/ozone mixture.

In some embodiments of the apparatus according to the first or second aspect the recirculation conduit is in fluid communication with a fresh water conduit via a fresh water feed point. In such embodiments, the fresh water conduit generally contains a feed point at which the air/ozone mixture is feedable into the fresh water. The pump is typically arranged between the connection of the recirculation conduit to the outlet conduit and the fresh water feed point in such embodiments.

In some embodiments of the apparatus according to the first or second aspect, the feed point for the air/ozone mixture is defined by a gas injector such as a nozzle. In some embodiments of the apparatus according to the first or the second aspect, the feed point for the air/ozone mixture is defined by a Venturi nozzle.

In some embodiments of the apparatus according to the first or second aspect, the recirculation conduit is connected to the inlet conduit via a connection defined by a non-return valve or non-return flap.

In some embodiments of the apparatus according to the first or the second aspect, the recirculation conduit is connected via a connection to the inlet conduit. The water filter is in such embodiments generally arranged upstream of this connection in the inlet conduit.

In some embodiments of the apparatus according to the first or second aspect, the reactor further includes an inlet for a conduit for feeding chemicals such as $H_2O_2$, hydrochloric acid, citric acid or the like from a container with a dosing pump.

In some embodiments of the apparatus according to the first or second aspect, the pump in the recirculation conduit is a controllable pump. In some embodiments, the pump in the recirculation conduit is a frequency-controlled pump.

In some embodiments of the apparatus according to the first or second aspect, the container is designed as a container with dosing lance and level control.

In some embodiments of the apparatus according to the first or the second aspect, the inlet conduit includes a pressure sensor. In some embodiments of the apparatus according to the first or second aspect, the recirculation conduit includes a pressure sensor.

In some embodiments of the apparatus according to the first or second aspect, the second reaction chamber includes a temperature sensor.

In some embodiments of the apparatus according to the first or second aspect, the second reaction chamber includes a UV sensor.

In some embodiments of the apparatus according to the first or second aspect, the controllable circulation pump can be controlled by means of values that may be output by the pressure sensor.

In some embodiments of the apparatus according to the first or the second aspect, the controllable circulation pump is controllable by means of values that are outputtable by such a pressure sensor. In some embodiments of the apparatus according to the first or second aspect, the controllable circulation pump is controllable by means of values output by the temperature sensor. In some embodiments of the apparatus according to the first or second aspect the controllable circulation pump is controllable by means of values output by the UV sensor. In some embodiments, the controllable circulation pump is controllable both by values that can be output by the UV sensor and by values that can be output by the temperature sensor.

In some embodiments of the apparatus according to the first or second aspect, the air inlet of the first reaction chamber is controllable.

In some embodiments of the apparatus according to the first or second aspect, the air inlet of the first reaction chamber is coupled to an air supply controller. As explained above, the inlet conduit may include a pressure sensor. The recirculation conduit may also include a pressure sensor. The second reaction chamber can also include a temperature sensor, see above. In some embodiments, the air inlet can be regulated by means of the values that can be output by such a pressure sensor. In some embodiments, the air inlet is controllable by means of the values that can be output by the temperature sensor. In some embodiments, the air inlet is controllable by means of the values that can be output by the UV sensor. In some embodiments, the air inlet is controllable both by values that can be output by the UV sensor and by values that can be output by the temperature sensor.

In some embodiments of the apparatus according to the first or second aspect, the recirculation conduit is connected to the inlet conduit via a connection and the water filter is arranged upstream of this connection in the inlet conduit.

As already explained above, the pump in the recirculation conduit may be a controllable pump. In some embodiments of the apparatus according to the first or second aspect, the pump in the recirculation conduit is frequency controllable in such a way that the suction capacity for the air/ozone mixture is essentially constant. In some embodiments of the apparatus according to the first or the second aspect, the pump in the recirculation conduit may be frequency controllable in such a way that the suction capacity for the air/ozone mixture is constant.

In some embodiments of the apparatus according to the first or the second aspect, the air inlet of the first reaction chamber is controllable in such a way that the suction capacity for the air/ozone mixture is adaptable to the flow rate of water through the second reaction chamber of the reactor. In some embodiments of the apparatus according to the first or the second aspect, the air inlet of the first reaction chamber is controllable in such a way that the amount of air/ozone mixture that is fed in per predefined amount of water is constant.

In some embodiments of the apparatus according to the first or second aspect, the reactor of the apparatus does not include a filter. In some embodiments, the reactor of the apparatus does not contain an activated carbon filter. In some embodiments, the apparatus does not contain an activated carbon filter. In some embodiments there is no photocatalyst such as titanium dioxide in the reactor of the apparatus. In some embodiments, the apparatus does not contain a photocatalyst such as titanium dioxide.

In a third aspect, there is provided the use of an apparatus according to the first or second aspect for the continuous treatment of process water with ozone and ultraviolet radiation. In this use, the inlet conduit contains a circulation pump configured to pump water in the direction of the reactor. The water filter is arranged between the circulation pump and the reactor in this use. In the use, process water is pumped into the reactor via the inlet conduit by means of the circulation pump. Air passing through the first reaction chamber of the reactor is also exposed to the—ultraviolet radiation of the UV lamp to form ozone. During use, the water flowing through the second reaction chamber of the reactor, enriched with an air/ozone mixture, is also exposed to the ultraviolet radiation of the UV lamp. Furthermore, the treated water is partially recirculated to the process water and the resulting air/ozone mixture is fed into the recirculated, treated water. Feeding of the air/ozone mixture into the recirculated water takes place before the recirculated water is fed into the process water. The pressure of the recirculated water is increased by means of the pump in the recirculation conduit.

In some embodiments, the air/ozone mixture is fed directly into the recirculated treated water that is in the recirculation conduit for partial recirculation of the treated water. In some embodiments, fresh water is furthermore fed into the recirculation conduit from a fresh water conduit via a fresh water feed point. In such embodiments, the air/ozone mixture may also be fed into the fresh water.

In some embodiments, process water is pumped into the reactor via the bypass branch and via the inlet conduit by means of the second controllable circulation pump that is connected in parallel to the circulation pump.

In a fourth aspect, there is provided a use of an apparatus according to the first or the second aspect for the continuous treatment of process water with ozone and ultraviolet radiation. In this use, the inlet conduit includes a circulation pump configured to pump water in the direction of the reactor. The water filter is in this use arranged between the circulation pump and the reactor. In the use, process water is pumped via the inlet conduit into the reactor by means of the circulation pump. Air flowing through the first reaction chamber of the reactor is furthermore exposed to the ultraviolet radiation of the UV lamp to form ozone. In the use, also in the second reaction chamber of the reactor, process water flowing through the same, being enriched with an air/ozone mixture, is exposed to the ultraviolet radiation of the UV lamp. Furthermore, process water is pumped into the reactor via the bypass branch and the inlet conduit, by means of the second, controllable circulation pump connected in parallel to the circulation pump.

In some embodiments, the treated water is partially recirculated into the process water and the resulting air/ozone mixture is fed into the recirculated treated water. The feeding of the air/ozone mixture into the recirculated water is done before the recirculated water is fed into the process water. The pressure of the recirculated water is increased by means of the pump in the recirculation conduit.

In some embodiments, the air/ozone mixture is fed directly into the recirculated treated water in the recirculation conduit for partial recirculation of the treated water. In some embodiments, fresh water is furthermore fed into the recirculation conduit with a fresh water conduit via a fresh water feed point. In such embodiments, the air/ozone mixture may also be fed into the fresh water.

The process water can be contaminated with germs and/or contaminated with low-molecular weight organic compounds and/or salts.

In a fifth aspect, there is provided a process for the treatment of process water with ozone and ultraviolet radiation by means of the apparatus according to the first or to the second aspect. In this process, the inlet conduit contains a circulation pump configured to pump water in the direction of the reactor. The water filter is, in this process, arranged between the circulation pump and the reactor. The process includes pumping process water into the reactor via the inlet conduit by means of a circulation pump. The process furthermore includes allowing air to flow through the first reaction chamber of the reactor while exposing that air to ultraviolet radiation from the UV lamp to form ozone.

The process includes feeding the resulting air/ozone mixture into the process water or the water to be treated. In some embodiments, the process includes feeding the resulting air/ozone mixture directly into the process water or the water to be treated. In some embodiments, the process includes adding further water to the process water, into which the resulting air/ozone mixture is fed.

Furthermore, the process includes partially recirculating some of the treated water to the process water. The process also includes feeding the air/ozone mixture into the recirculated water and increasing the pressure in the recirculated water by means of a pump.

In some embodiments, the process includes pumping the process water into the reactor via the bypass branch and the inlet conduit, by means of the second controllable circulation pump connected in parallel to the circulation pump.

In a sixth aspect, there is provided a method of treating process water with ozone and ultraviolet radiation by means of the apparatus according to the first or the second aspect. In this process, the inlet conduit includes a circulation pump configured to pump water in direction of the reactor. In this process, the water filter is arranged between the circulation pump and the reactor. The process includes pumping process water into the reactor via the inlet conduit by means of a circulation pump. The process further includes allowing air to flow through the first reaction-chamber of the reactor while exposing that air to ultraviolet radiation from the UV lamp to form ozone. The process also includes feeding the resulting air/ozone mixture into the water to be treated. The process also includes pumping the process water into the reactor via the bypass branch and the inlet conduit by means of the second controllable circulation pump connected in parallel to the circulation pump.

In some embodiments, the process includes feeding the resulting air/ozone mixture into the water to be treated. In some embodiments, the process includes feeding the resulting air/ozone mixture directly into the process water. In some embodiments, the process includes adding further water to the process water, into which the resulting air/ozone mixture is fed. In some embodiments, in which the resulting air/ozone mixture is fed into the process water, the process includes partially recirculating some of the treated water to the process water. The process may also include feeding the air/ozone mixture into the recirculated water, as well as increasing the pressure in the recirculated water by means of a pump.

The summary provided above is not limiting, and other features and advantages of the apparatus described herein should be apparent from the following detailed description, the drawings and the claims.

DESCRIPTION OF THE DRAWINGS

FIG. 8A depicts the measurement setup when collecting measurement data using the apparatus.

FIG. 8B depicts the effect of the apparatus on *E. coli*.

FIGS. 9A and 9B depict the effect of the apparatus on *B. subtilis* spores.

FIGS. 10A and 10B show the effect of two differently configured apparatuses on *B. subtilis* spores.

DETAILED DESCRIPTION

Figure 1:
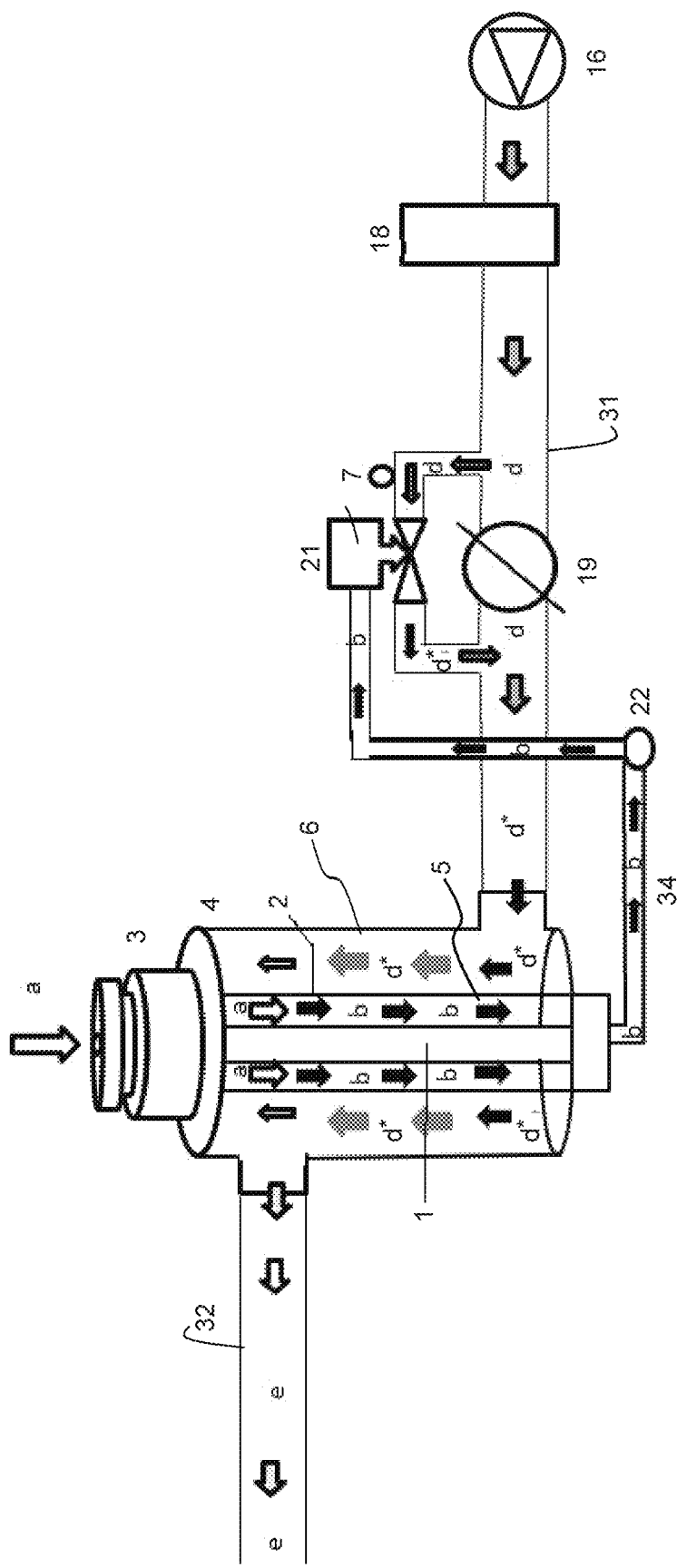
FIG. 1 depicts a schematic flow diagram based on a known system for the treatment of process water.

The term "consisting of" as used in this document means inclusive and limited to what follows the term "consisting of". The term "consisting of" thus indicates that listed elements are necessary of necessary and that no other elements may be present. The term "essentially consisting of" is understood to mean that any elements defined according to the term are included and that other elements, for example in a sample or a composition, may be present which do not alter, i.e. do not affect or contribute to, the activity or effect indicated for the elements specified in this document. In other words, the term "essentially consisting of" indicates that the defined elements are necessary or required, but that other elements are optional and may or may not be present, depending on whether or not they are relevant to the effect or effectiveness of the defined elements.

The term "treatment", when used herein in relation to water, means improving water for consumption, for example as drinking water or for use in a pond or swimming pool, by depleting or removing impurities.

The term "process water" refers to water that, compared to fresh water or drinking water that meets regulatory requirements in Europe or the US, contains significantly more contamination in the form of microorganisms and/or low-molecular weight organic compounds. Process water may also contain significantly increased amounts of inorganic salts. Process water may also contain macroscopic impurities. Significantly increased in relation to water, when used herein, means that regulatory requirements for drinking water quality are exceeded for at least one pollutant.

The word "about" as used herein refers to a value being within an acceptable error range for the particular value as determined by one of ordinary skill in the art. This will depend in part on how the value is measured or determined, i.e., the limitations of the measurement system. For example, "about" can mean within one, or more than one standard deviation, per the practice in the art. The term "about" is also used to indicate that the amount or value in question may be the value designated or some other value that is approximately the same. The phrase is intended to convey that similar values promote equivalent results or effects as disclosed in this document. In this context "about" may refer to a range above and/or below of up to 10% of a certain value. The word "about" refers in some embodiments to a range above and/or below a certain value that is up to 5%, such as up to up to 2%, above and/or below a certain value. In some embodiments, "about" refers to a range of up to 1% above and/or below a certain value. In some embodiments, "about" refers to a range of up to 0.5% above and/or below a certain value. In an embodiment, "about" refers to a range of up to 0.1% above and/or below a certain value.

The term "water filter" refers to an element that contains a material through which water can flow, such as sand, a gravel bed, ion exchange material, activated carbon, a porous polymer, e.g. a polymer foam or polymer fleece ("filter cotton wool"), sintered glass beads ("activated glass") or a membrane, such as an ultrafiltration membrane, and thus physically acts as a sieve. Typically, a water filter is dimensioned and configured such that water flowing through the same has a certain minimum residence time, e.g. a few seconds, to contact the material acting as a sieve, at a maximum flow rate permitted in the system. A water filter can be a conventional drinking water filter. Regulations exist for drinking water filters which are intended to reduce certain health-relevant pollutants in public or private water supplies. A water filter may contain a material that allows the colonization of microorganisms. This allows, in addition to the filtration of coarse or fine suspended particles, biodegradation of toxic waste materials by microorganisms.

The terms "before" and "after" refer to the direction of flow of water in an apparatus disclosed herein. The presence of a circulation pump, for example, determines a flow direction in an inlet conduit in the direction of the reactor. As a further example, the presence of a pump in a recirculation conduit determines a flow direction in that conduit from an outlet conduit of the reactor towards an inlet conduit of the reactor.

The conjunctional expression "and/or" between several elements, when used herein, is understood to encompass both individual and combined options. For example, if two elements are linked by "and/or", a first option concerns the use of the first element without the second one. A second option concerns the use of the second element without the first one. A third option concerns the use of the first and second elements together. It is understood that any of these options falls within the meaning of the term and thus meets the conditions of the term "and/or" as used in this document.

Singular forms such as "a", "an" or "the" include the plural form when used in this document. Thus, for example, reference to a "cell" includes a single cell as well as a plurality of cells. In some cases, the term "one or more" is used explicitly to indicate that the singular form includes the plural form. Such explicit indications do not limit the general meaning of the singular form. Unless otherwise indicated, the term "at least" preceding a series of elements is to be understood to refer to every element in the series. The terms "at least one" and "at least one of" include for example, one, two, three, four or more elements.

Since the apparatus disclosed herein is based on the already known apparatus from Berson (2007, supra), in the following the principle of water treatment will be explained with reference to this apparatus, which is the basis of the apparatus disclosed herein. These explanations apply especially to the apparatus disclosed herein, and, in the context of the explanations, features and embodiments are also addressed which, in this form, are not part of the apparatus that is already known.

The known apparatus includes a cylindrical reactor, which contains a first inner and a second outer reaction chamber. The first inner reaction chamber includes an inlet side with an air inlet. The inlet side may further include a lid, an air filter and a mounting plate. The first inner reaction chamber also includes a radiation source for UV radiation, referred to herein as the UV lamp. This radiation source is arranged within a circumferential wall that is transmissive, for example transparent, to UV radiation. The circumferential wall, which is transmissive to UV radiation, is typically a quartz tube. The apparatus disclosed herein typically includes a radiation source only at a central position in the reactor. This radiation source may be composed of a plurality of individual radiation sources, nevertheless in the apparatus disclosed herein it typically defines the only radiation source.

Air passes through the first inner reaction chamber while it is exposed to the ultraviolet radiation of the UV lamp with a wavelength of about 185 nanometers to form ozone from oxygen. The reactor includes an outlet for the air/ozone mixture formed, which is connected to an air/ozone conduit. By means of this air/ozone conduit, the air/ozone mixture is fed into the inlet conduit for the water to be treated via an inlet point, for example a Venturi nozzle. The feed occurs in a bypass branch of the inlet conduit for the water to be treated.

The second, outer reaction chamber of the reactor contains an inlet conduit connected to the reactor for the water to be treated as well as the air/ozone mixture that is already fed into the water. The water to be treated consists of process water or at least contains process water. The water to be treated flows through this second reaction chamber while it is exposed to the ultraviolet radiation of the UV lamp with only one wavelength range of about 250 to 260 nm, typically a wavelength of about 254 nanometers, and is thus disinfected. The proceeding process includes the "extended oxidation" described below and is thus based on the effect of the ozone present on the one hand, and on the effect of the UV radiation on the other hand, as well as on reaction products formed in situ during the exposure of ozone to UV radiation. The reactor also contains a connected outlet conduit for the treated process water.

Ozone is an allotrope of oxygen of the formula $O_3$, which is formed from oxygen by the action of UV light. In the dark, ozone molecules rapidly decompose into biatomic oxygen $O_2$. Ozone is a powerful oxidizing agent capable of killing microorganisms and degrading low-molecular weight compounds. UV/ozone generators usually employ UV light of the narrowest possible wavelength range for forming $O_3$. An apparatus disclosed herein employs UV light of a very narrow wavelength range for forming $O_3$, generally about 185 nm. In addition, it employs light from a second very narrow wavelength range, generally around 254 nm, to directly irradiate water.

By means of the UV light inter alia microorganisms are effectively killed in the second reaction chamber. It has been observed that simultaneous introduction of the ozone/oxygen mixture into water to be treated and the irradiation of this water to be treated with UV light at 254 nanometers is suitable for oxidizing in situ dissolved and dispersed impurities ("micropollutants", see above) as well as microbiological contaminations. The decomposition of ozone in water, upon exposure to UV light, leads to a reaction with water molecules and $OH^-$ ions, leading to the intermediate formation of $OH.$ radicals and $H_2O_2$. Respective reactions also take place in the presence of water vapor in the troposphere.

Oxidation by means of ozone and hydrogen peroxide or an additional combination with UV radiation (UV oxidation) is also known to the skilled artisan as "advanced oxidation processes" (AOP) or "extended oxidation". A central role is attributed to the intermediate formation of $OH.$ radicals, since these highly reactive and extremely unstable intermediate products react with any existing compound without selectivity quasi at the moment of their formation. The occurrence of these radicals in water explains that the combination of UV radiation and ozone allows almost any compound in water to be oxidized, often at a diffusion-controlled reaction rate. The low-molecular weight compounds to be degraded ("micropollutants", see above) are largely degraded to $CO_2$, water and salts. An overview of the fundamental work involved in studying the mechanisms that characterize the process known as AOP has been provided in a review by Andreozzi et al. (Andreozzi, R., et al., Catalysis Today 53 (1999) 51-59). The molecular processes involved in the action of UV radiation on an ozone/water system are also discussed in there.

For an apparatus on which the apparatus disclosed herein is based (Berson et al., 2007), it has been demonstrated that its anti-microbial effect can, for example, reduce the use of residual disinfectants in swimming pools and reduce the presence of low molecular organic compounds such as disinfection by-products in water (http://www.demeaume-d.eu/index.php/diss/news/65-results-of-the-greywater-technologies-from-the-demonstration-site). It has further been demonstrated that the presence of ozone increased the inactivation of *B. subtilis* spores.

An apparatus disclosed herein allows continuous feeding of higher amounts of ozone into the reactor, compared to the known apparatus (see above), without the need to supply the very unstable ozone to the apparatus from an external source. In this way an improved oxidation effect is achieved. In particular, an increased formation of OH. radicals in the second reaction chamber of the reactor is achieved. An apparatus disclosed herein for treating process water with ozone and ultraviolet radiation includes a reactor containing a UV lamp. In some embodiments the reactor consists of a circumferential wall with a first and a second reaction chamber, an air inlet side and a base.

In some embodiments, the circumferential wall of the reactor does not contain an interior surface facing the interior of the reactor that reflects UV radiation. In some embodiments, the circumferential wall of the reactor does not contain a radiation-reflecting inner surface pointing into the interior of the reactor.

An inlet conduit for the process water or the water to be treated is connected to the reactor. Furthermore, an outlet conduit for the process water and the water to be treated, respectively, is connected to the reactor. The reactor contains a first and a second reaction chamber. The first reaction chamber contains an air inlet. The air inlet may be provided with an air filter or coupled to an air filter. The first reaction chamber is capable of allowing air to pass therethrough, while the latter is exposable to ultraviolet radiation from the UV lamp to form ozone. The second reaction chamber is capable of allowing water to be treated to flow therethrough, while the latter is exposable to ultraviolet radiation from the UV lamp. The reactor furthermore contains an outlet for the air/ozone mixture. An air/ozone conduit is connected to the outlet for the air/ozone mixture, via which the air/ozone mixture can be fed into the inlet conduit for the water to be treated.

Feeding of the air/ozone mixture can be done through a gas injector such as an injector coupled to an injection pump. This may be a nozzle, e.g. designed as a gas injection nozzle. Gas injectors are commercially available, for example, from Fortrans (NC, USA) or Bauer (Munich, Del.).

In addition to the reactor, the apparatus is configured for coupling to a water filter. In some embodiments, the apparatus includes a water filter which acts mainly as a mechanical sieve. This way, on the one hand, macroscopic pollutants, including for example algae or leaves, are retained by the filter; on the other hand, deposits are formed in the filter material over time due to bacterial growth. As a result, the permeability of the water filter is reduced. Thus, an ever increasing pressure would have to be built up to achieve a continuous flow rate through the water filter. After a filter cleaning or an exchange of the filter material, however, the permeability of the water filter increases abruptly.

Consequently, with constant pumping power, the line pressure in an apparatus containing only a reactor, an air/ozone feed, a circulation pump and a water filter would be subject to severe fluctuations. The consequences of these fluctuations cannot be compensated with a stopcock such as a ball valve shown in FIG. 1, especially since such a stopcock can only be changed between the states "open" and "closed". The ball valve is connected in parallel to the feed for the air/ozone mixture by providing a bypass branch. One branch of this bypass branch contains the feed for the air/ozone mixture, while the other branch contains the ball valve. By opening or closing the ball valve, however, the flow of filtered process water, into which the air/ozone mixture is fed, can be changed.

In contrast thereto, embodiments of a device disclosed herein allow an essentially constant flow of water to be generated, into which water, on the one hand, the air/ozone mixture is feedable and which water, on the other hand, flows through the second reaction chamber of the reactor.

Figure 2:
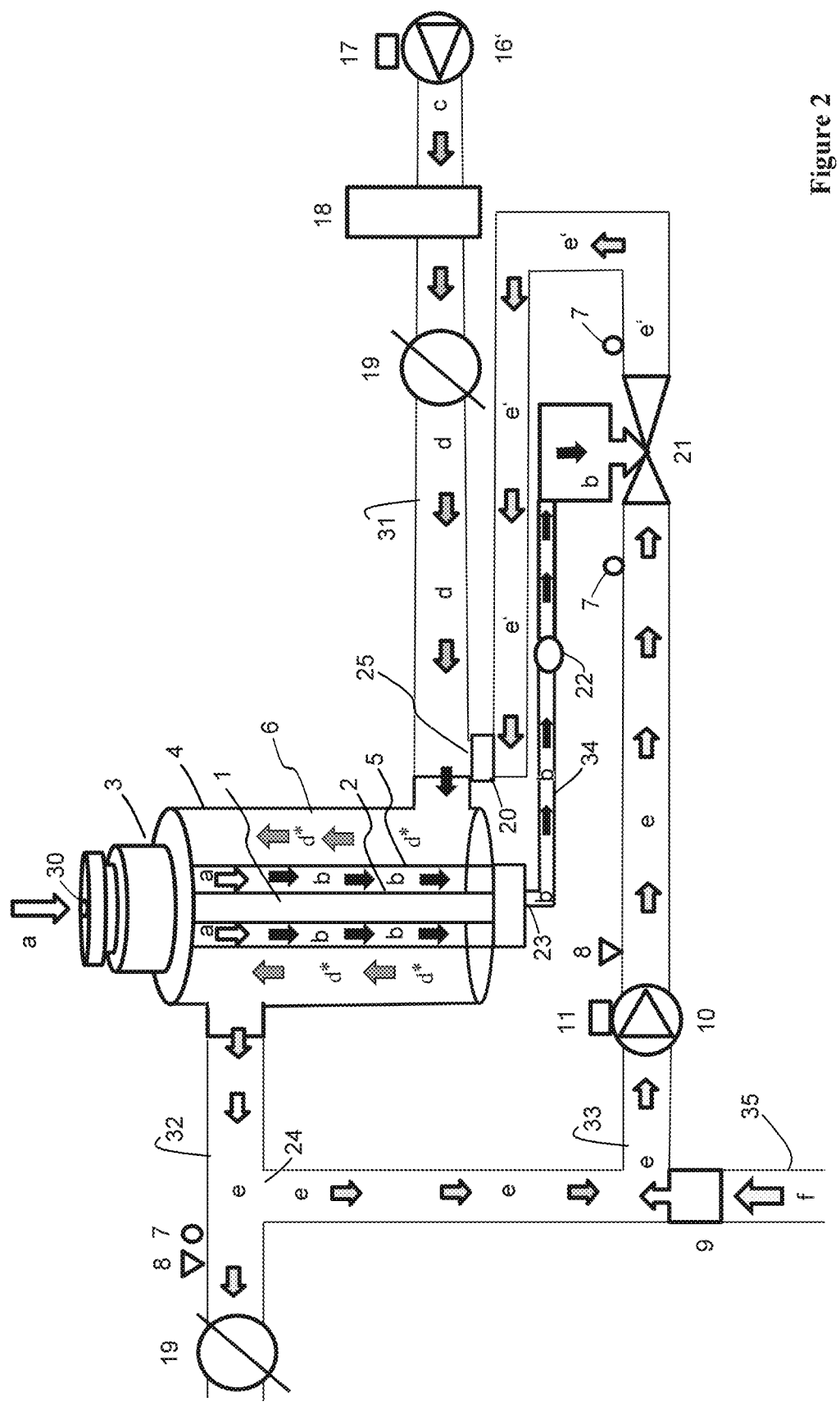
FIG. 2 depicts a schematic flow diagram of one embodiment of the apparatus disclosed herein.

In one embodiment, a recirculation conduit is provided with a pump which is capable of supplying treated water to the filtered water to be treated, as illustrated in FIG. 2. The recirculation conduit can be regarded as a return loop. It establishes a connection between the outlet conduit of the reactor and the inlet conduit of the reactor. Surprisingly, it has been observed that only one element has to be provided to ensure a flow in this recirculation loop from the outlet conduit of the reactor towards the inlet conduit of the reactor. In this way, undesired flow directions in the recirculation conduit or recirculation loop are prevented and an essentially constant flow of water is possible, the water being enriched with the air/ozone mixture. For this purpose, a pump is provided which is configured to pump water towards the inlet conduit of the reactor. The pump may be a controllable pump. In this way, fluctuations in the pressure can be compensated, which can occur in particular in the inlet conduit of the reactor.

In such embodiments, a recirculation conduit is provided for partially recirculating the treated water from the outlet conduit to the inlet conduit. This recirculation conduit may contain a feed point at which the air/ozone mixture can be fed in. The recirculation conduit further contains a pump.

Figure 3:
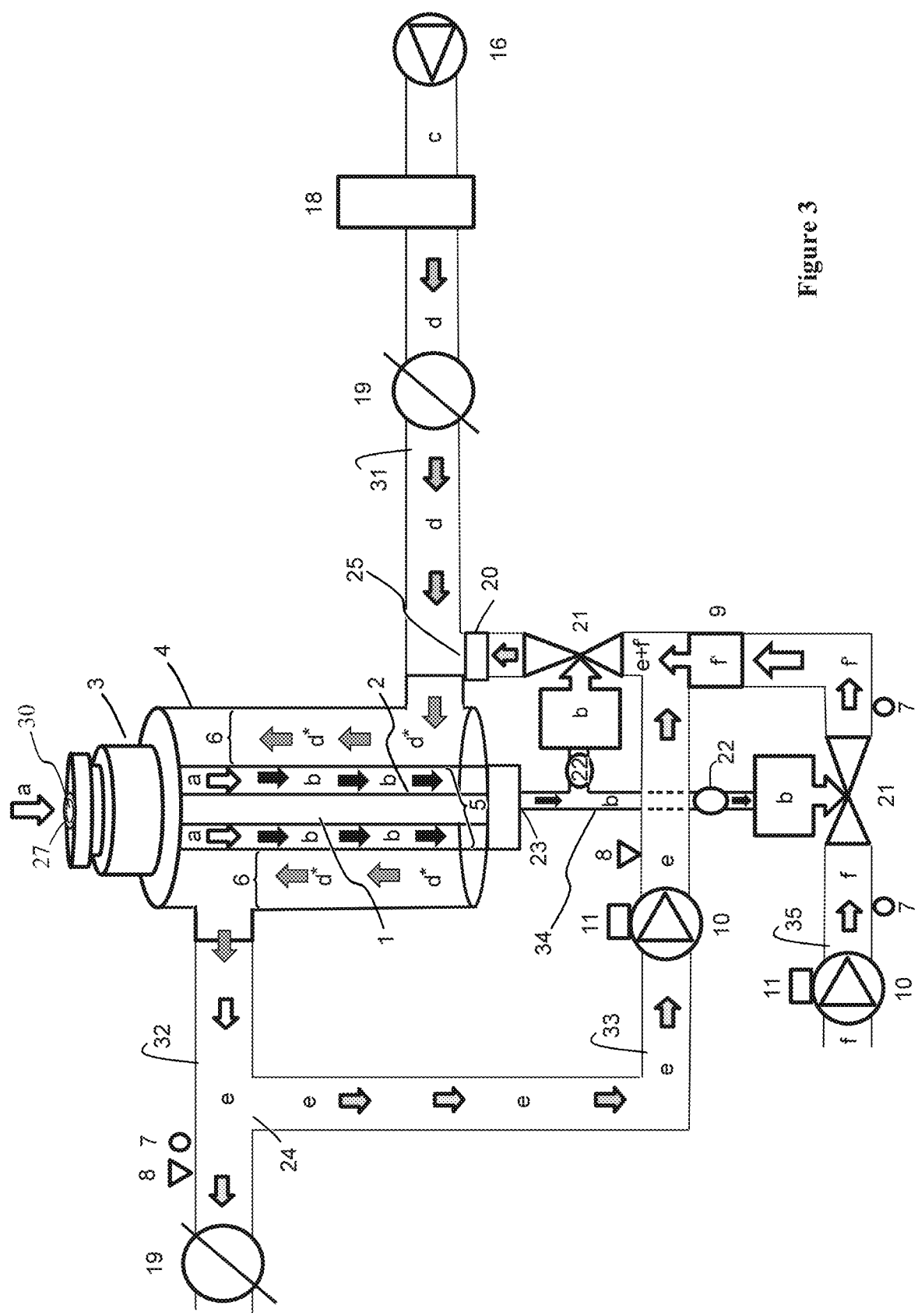
FIG. 3 depicts a schematic flow diagram of another embodiment of the apparatus disclosed herein.

Depending on whether the system the water of which is to be treated is a closed system such as a basin or a tank, or an open system such as a water supply from a polluted water source, a supply of fresh water may also be integrated into the apparatus disclosed herein. The feed of fresh water is typically done in the recirculation conduit, which is suitable for supplying treated water to the filtered water that to be treated. As illustrated in FIG. 3, in such a case the air/ozone mixture may also be fed into a corresponding fresh water supply conduit. Such a fresh water feed conduit typically includes a pump configured to pump water towards the inlet conduit of the reactor.

In one embodiment, a second controllable circulation pump connected in parallel to the circulation pump can be used to generate an essentially constant flow of water. The air/ozone mixture may be fed into a recirculation conduit with a pump or into a bypass branch, where it is connected in parallel to a flow control element such as a stopcock. The air/ozone mixture can also be fed into an additional fresh water feed conduit, as already indicated above.

Both the first circulation pump and the second, controllable circulation pump are configured in such a way that they pump water in the direction of the water filter and thus of the reactor. In this way, on the one hand, an increased pressure can be built up on the water filter if necessary. On the other hand, the additional pressure on the water filter can be regulated. By a non-return valve, which is arranged in each of the two parallel arms of the bypass branch and inlet conduit between the corresponding circulation pump and the water filter, uncontrolled backward flow can be prevented.

In some embodiments of the apparatus disclosed herein, a recirculation conduit is provided for partial recirculation of the treated water from the outlet conduit to the inlet conduit. This recirculation conduit contains a feed point at which the air/ozone mixture can be fed in. The recirculation conduit contains a pump. The feed point where the air/ozone mixture is added is typically arranged downstream of the pump. In other words, the pump is typically arranged between the connection of the recirculation conduit to the outlet conduit and the feed point. The feed point is typically arranged between the pump and the connection of the recirculation conduit to the inlet conduit. A check valve may be arranged at the inlet of the recirculation conduit into the inlet conduit.

In some embodiments, the first reaction chamber is cylindrical. In some embodiments the—second reaction chamber is concentric. The second reaction chamber may for instance have the shape of a hollow cylinder. The center of the hollow cylinder may in some embodiments be defined by the first reaction chamber. In cross-section, for example, the first and second reaction chambers may define concentric circles, of which the second reaction chamber defines an outer circle relative to which the first reaction chamber defines an inner circle. The reactor may in such embodiments in cross section define a circle, in which the first and second reaction chamber define two concentric circles, of which the first reaction chamber defines an inner concentric circle. The UV lamp may in such embodiments in cross-section define the center of the reactor, around which the concentric circles are arranged that define the first and second reaction chamber.

In some embodiments, the pump is arranged between the connection of the recirculation conduit at the outlet conduit and the feed point for the air/ozone mixture.

In some embodiments, the feed point is designed as a Venturi nozzle.

In some embodiments, the recirculation conduit is connected to the inlet conduit via a check valve.

In some embodiments, a recirculation system is provided for partially recirculating the treated water from the outlet conduit to the inlet conduit of the pre-filtered process water. This recirculation conduit can contain an additional feed for fresh water. Furthermore, the recirculation can include a pump followed by a feed point at which the air/ozone mixture is added. The recirculation may also include a non-return valve.

In some embodiments, the reactor contains a connection or an access point for a feed conduit for chemicals at the bottom of the second reaction chamber. This connection may, for example, be arranged in the base of the reactor in the second reaction chamber. This connection may also be arranged within a lateral wall, e.g. a circumferential wall of the reactor in the second reaction chamber. For example, the connection may be arranged in a lateral wall of the reactor in the second reaction chamber proximate to the base, including contiguous to the base. In some embodiments, the reactor includes a connection or an access point for a conduit for feeding chemicals such as $H_2O_2$, hydrochloric acid, citric acid or the like from a container with a dosing pump. In some embodiments, the reactor includes in the base or proximate to the base, for example in a lateral wall, of the second reaction chamber, an inlet for a feed conduit for chemicals such as hydrogen peroxide, hydrochloric acid, citric acid or the like from a container with a dosing pump.

In some embodiments, the booster pump is arranged between the connection of the recirculation conduit to the outlet conduit and the feed point for the air/ozone mixture. In some embodiments, the feed point is designed as a Venturi nozzle. In some embodiments, the recirculation conduit is connected to the inlet conduit via a check valve.

In some embodiments, the inlet conduit upstream of the feed point for the air/ozone mixture contains a water filter. In some embodiments, the inlet conduit includes a water filter between the circulation pump and the feed point for the air/ozone mixture. In some embodiments, the booster pump is frequency-controlled, such that the suction power for the air/ozone mixture is essentially constant. In some embodiments, the booster pump is frequency-controlled, so that the suction capacity for the air/ozone mixture is constant. In some embodiments, the feeding of the air/ozone mixture occurs in the recirculation conduit of the water already treated by the reactor. In some embodiments, the feeding of the fresh water occurs prior to the feeding of the air/ozone mixture, and only then the resulting mixture is fed into the second reactor chamber of the reactor. In some embodiments, the pump provides the pressure increase required for the feeding of the air/ozone mixture and for the feeding of fresh water prior to the connection of the reactor that is for the water to be treated. In some embodiments, the feed point for the ozone/air mixture is designed as an injection element, for example as a Venturi nozzle. In some embodiments, the pump is frequency controlled in such a way that the suction capacity for the air/ozone mixture is at least essentially constant and can thus be optimized for the application. In some embodiments, the recirculation conduit is connected to the inlet conduit via a non-return valve.

In some embodiments, the pump is configured as a frequency-controlled pump or booster pump. In some embodiments the container is configured as a container with dosing lance and level controller. In some embodiments, the non-return valve is designed as a non-return flap.

In some embodiments, the Venturi nozzle is arranged in the recirculation conduit for the already treated process water. In some embodiments, the fresh water feed is arranged prior to the feed of the air/ozone mixture. In some embodiments, the pump is configured as a frequency-controlled pump. In some embodiments, the Venturi nozzle is equipped with a pressure sensor, for example equipped with one or two pressure manometers. In this case, the pressure difference in the conduit, for example in the recirculation conduit upstream and downstream of the Venturi nozzle, can be determined. In general, any type of signal transmission, whether wireless or wired, is suitable for sensors included in the apparatus disclosed herein. The pressure sensors can each be coupled to a transmitter. In some embodiments, a control for the frequency-controlled pump is provided on the basis of a determined pressure difference.

In some embodiments the container includes a dosing lance and a level controller and a metering pump. In some embodiments a non-return valve is present.

In some embodiments the flow of air into the first reaction chamber of the reactor and the flow of water into the second reaction chamber of the reactor can be controlled by means of controllers. Thus, the air inlet of the reactor may be controllable. A pump where present may also be controllable. One or more sensors may be provided in the apparatus for controlling the flow of air or water. Thus, a UV sensor may be arranged in the interior of the first and/or the second reaction chamber. There may also be a temperature sensor arranged in the interior of the second reaction chamber. In some embodiments, one or more pressure sensors may be arranged in the vicinity of the feed point for the air/ozone mixture. For example, the feed point for the air/ozone mixture may be arranged between two pressure sensors.

With the help of the values of the individual sensors, for example, the performance of an existing pump can be controlled. Thus, with the aid of the pumping power, a specific temperature, such as a temperature in the range of 16° C. to 24° C. or in the range of 25° C. to 38° C., may be controlled in the second reaction chamber of the reactor. A respective temperature range can also be in the range of about 30° C. to about 37° C.

An apparatus disclosed herein may be used for water treatment, including for treating water contaminated with microorganisms and with "micropollutants", especially water contaminated with low molecular weight organic impurities. Such water is referred to herein as process water. In a respective process disclosed herein, the irradiation of air is done by means of ultraviolet radiation having a wavelength of about 185 nanometers. Simultaneously, the irradiation of process water by ultraviolet irradiation having a wavelength of about 254 nanometers takes place in parallel. An apparatus described herein is employed in such a use and such a process. The use or process includes allowing air to flow through the first reaction chamber of the reactor while it is exposed to ultraviolet radiation from the UV lamp having a wavelength of about 185 nanometers to form ozone from oxygen.

In some embodiments, the UV lamp consists of a plurality of individual UV lamps. Each lamp of this plurality of UV lamps may be arranged within the interior of a first reaction chamber and for example be surrounded by a quartz tube. Each lamp of this plurality of UV lamps may be arranged within the interior of a first reaction chamber, which each reaction chamber including an outlet for the air/ozone mixture and being coupled to a gas conduit. In some embodiments, the reactor includes two or more centrally arranged UV lamps, for example four or more centrally arranged UV lamps. The choice of the UV lamp and the dimensions of the reactor depend on the intended use and on the volumes of the desired use. In some embodiments, the UV lamp(s) is/are selected in such a way that in the second reaction chamber a UV dosage in the range of about 5 to 100 mJ/m$^2$ is achieved, including in the range of about 20 to 50 mJ/m$^2$. In some embodiments, the UV lamp(s) is/are selected in such a way that in the second reaction chamber a UV dosage in the range of about 5 to 30 mJ/m$^2$ is achieved, for example a UV dosage in the range of about 12.5 to about 50 mJ/m$^2$. In some embodiments, the or a UV lamp of the reactor emits light with a power consumption of about 140 to 250 watts, including about 180 to 200 watts, at a temperature of the circulating air and of the water of between 26° C. and 37° C. The respective dosage of the UV light depends, inter alia, on the turbidity of the water to be treated and on the conversion rate of the water to be treated in the second reaction chamber in m$^3$ per hour. The dosage, in particular a minimum dosage, also depends on the type and nature of the micro-pollutants that are present and need to be degraded.

The use and the process disclosed herein also include feeding the air/ozone mixture into the recirculation conduit for partial recirculation of the process water already treated, or into the fresh water that is supplied here. Furthermore, the use or the process includes feeding the mixture of fresh water and purified process water thus obtained, enriched with an air/ozone mixture, into the feed conduit for water to be treated upstream of the second reaction chamber of the reactor. The second reaction chamber is passed through by a mixture of treated process water, fresh water and process water, which is enriched with the air/ozone mixture. The use and the process also include exposing the mixture in the second reaction chamber to ultraviolet radiation from the UV lamp having a wavelength of about 254 nanometers. The mixture is thereby disinfected.

UV light of about 254 nm, which lies within the so-called UVC range, is absorbed by nucleic acids, which consequently leads to the reaction and destruction of nucleic acids and thus to the killing of microorganisms. UV light of 254 nm can be generated by a low-pressure mercury vapor lamp. The use or process furthermore includes exposing air in the first reaction chamber to ultraviolet radiation from the UV lamp having a wavelength of about 185 nanometers. UV light of 185 nm can also be generated by a low-pressure mercury vapor lamp. In both cases the same low-pressure mercury vapor lamp can be used.

In some embodiments, the feeding of the air/ozone mixture is done by means of an injection device such as a gas nozzle.

In some embodiments, a controllable pump is used, for example a frequency-controlled pump. This allows achieving a particularly stable and for the application optimal suction performance of the air/ozone mixture. As an illustrative example, the pump may be a centrifugal pump. The rotational speed of the pump can be set for the required pumping power by means of a frequency converter or a frequency inverter.

In some embodiments, the air/ozone mixture is fed in by means of a combination of a Venturi nozzle and a frequency-controlled pump.

In some embodiments, the use or the process includes feeding chemicals into the lower part of the second reaction chamber of the reactor. These chemicals may be selected to remove deposits such as limescale on the outside of the quartz tube in order to ensure constant and optimal UV radiation in the second reaction chamber. An additional oxidizing agent such as hydrogen peroxide may also be introduced into the reaction chamber as a chemical agent, in order to increase the concentration of oxidizing agents. The processes of the Advanced Oxidation Process (AOP) described above can also be increased in this way.

In some embodiments, these system components are integrated in a compact system and can be automated, which facilitates the operation and maintenance of the apparatus.

In some embodiments, an apparatus disclosed herein includes a ball valve for opening or closing the flow of water through a conduit. As an example, a ball valve may be arranged in the inlet conduit. A ball valve may also be arranged in the outlet conduit. The respective opening or closing of the water flow can, for example, be carried out automatically, for example in order to be able to carry out a cleaning step. In some embodiments, an apparatus disclosed herein includes two ball valves, which may be opened and closed automatically, for example.

In some embodiments, an apparatus disclosed herein includes a container. This container may include a dosing lance and a level controller. In some embodiments, the container may be coupled to the reactor by means of a dosing pump. Such a dosing pump can, for example, be controlled automatically. In some embodiments of the reactor may include an additional outlet.

This additional outlet may, for example, be controllably opened and closed. The additional outlet is in some embodiments a tap. In some embodiments, an apparatus disclosed herein includes a frequency-controlled dosing pump. This pump may be controllable in a steering manner, for example. In some embodiments, an apparatus disclosed herein includes a frequency-controlled dosing pump, which may be controllable in a steering manner, for example.

In some embodiments, the use disclosed herein or the process disclosed herein includes removing deposits and contaminants on the outside of the quartz tube by flushing with a chemical substance such as an inorganic acid. e.g. hydrochloric acid or formic acid, or an organic acid such as acetic acid or citric acid.

Figure 4:
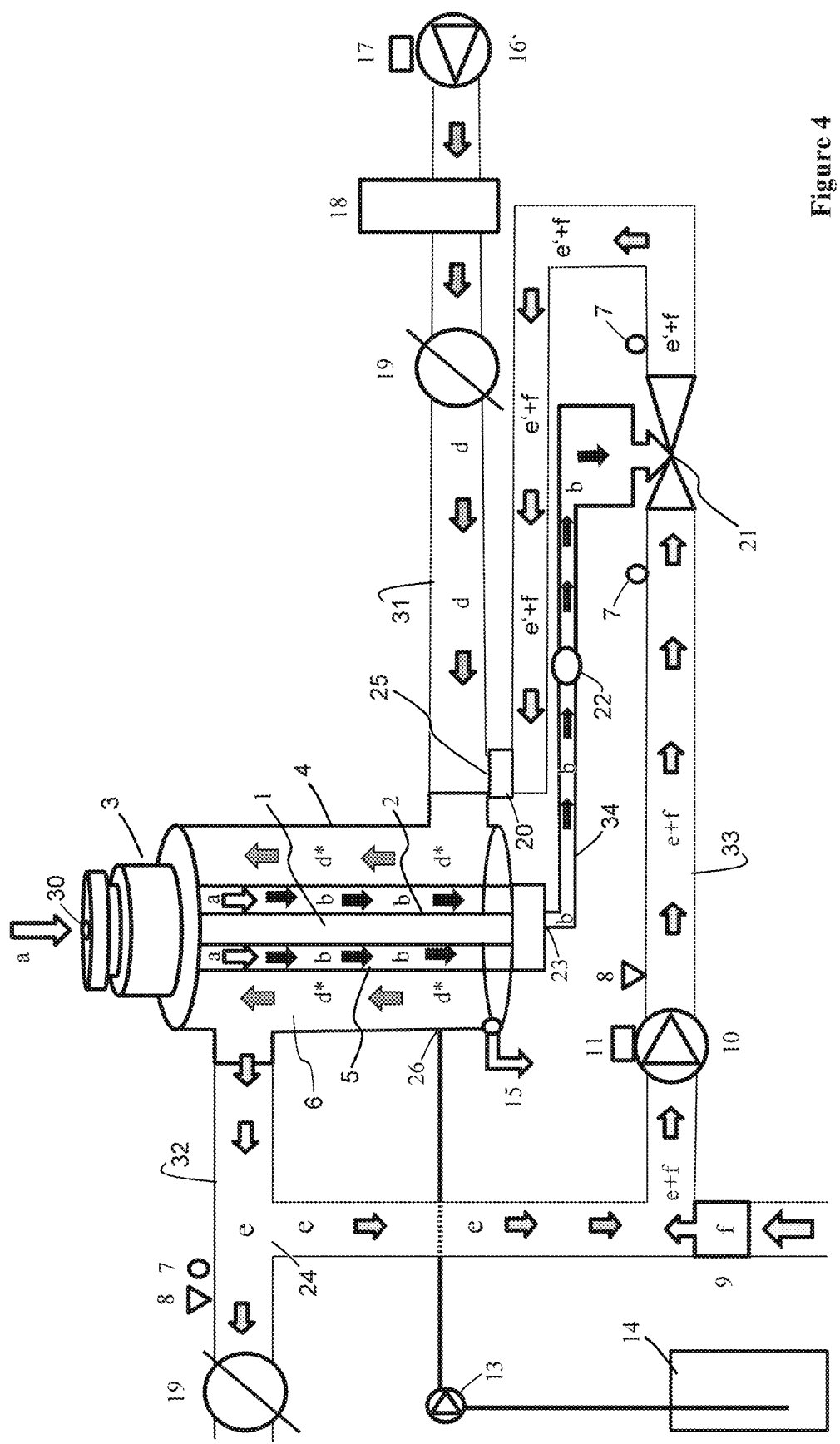
FIG. 4 depicts a schematic flow diagram of another embodiment of the apparatus disclosed herein.

As shown for example in FIG. 4, in some embodiments a stopcock, such as a ball valve, may be arranged between the water filter and the junction of a recirculation conduit into the inlet conduit, e.g. a non-return valve. In some embodiments, a stopcock or a ball valve may be arranged in the outlet conduit such that a connection of a recirculation conduit to the outlet conduit is positioned between the reactor and that stopcock. In some embodiments, a first stopcock, e.g., a ball valve, may be arranged in the inlet conduit between the water filter and an outlet of a recirculation conduit, and a second stopcock, e.g., a ball valve, may be arranged in the outlet conduit such that a connection of the recirculation conduit to the outlet conduit is positioned between the reactor and that this stopcock. A cleaning step as described above may, for example, be carried out on an embodiment with such a first stopcock and such a second stopcock.

In a cleaning step as described above, the two stopcocks can in such cases be closed initially, for example automatically. In this way, an internal closed circuit with the pump in the recirculation conduit becomes possible. In advance, a certain amount of liquid can be drained via a tap, which can also be controlled automatically, for example. A certain amount of a liquid chemical, typically the same volume as the amount of liquid drained in advance, is then metered into the second reaction chamber by a dosing pump, for example an automatically controlled dosing pump, in order to be circulated for a certain period of time by means of the pump arranged in the recirculation conduit.

Subsequently, the desired amount of liquid chemical can be metered from the container into the lower region of the container by means of the dosing pump, and circulated in the internal closed circuit for a certain period of time by means of the pump arranged in the recirculation conduit. After the cleaning process is complete, the entire liquid can be drained through an outlet of the reactor, such as a tap. The ball valves can be opened again and the apparatus can be operated in normal operation again.

Hydrogen peroxide may also be dosed into the second reaction chamber, for example in addition to a chemical already used.

In some embodiments, for example, the container may contain hydrogen peroxide. For this purpose hydrogen peroxide may be filled into the container. Hydrogen peroxide can be pumped into the lower region of the second reaction chamber via the dosing pump, for example in an automatically controlled manner. There hydrogen peroxide can be mixed with the process water and ozone, and again irradiated with UVC light, for example at 254 nanometers. As a result, an additional oxidation effect can be achieved. Also, by increasing the concentration of hydrogen peroxide, the formation of hydroxyl radicals is effectively increased, thereby intensifying the processes of the Advanced Oxidation Process (see above).

In the following, several embodiments of the apparatus disclosed herein will be described in more detail with reference to the drawings. In all drawings the same reference numerals have the same meaning and may therefore be explained only once as needed.

FIG. 1 shows an embodiment based on a known apparatus. The reactor 4 of the apparatus contains a UV lamp 1, which generally emits UV light with two different wavelengths. These can be wavelengths of 185 nanometers and 254 nanometers. A quartz tube 2 surrounds the UV lamp 1. The quartz tube is arranged within the reactor 4 where it defines a first reaction chamber 5. The reactor of the apparatus has an inlet side 3, which may in this case include an air supply to the first reaction chamber 5 for air a, a lid, an air filter and a mounting plate.

The reactor 4 of the apparatus includes two separate reaction chambers: An inner cylinder 5 with the quartz tube 2 as the outer wall and the UV lamp 1 contained therein. The reactor further contains an outer cylinder 6, which has a water inlet connection point and a water outlet connection point. In the reactor 4 with two reaction chambers, an air/ozone mixture b is formed from air a with 20% oxygen content in the first reaction chamber 5.

The reactor includes an outlet for the air/ozone mixture b formed, to which outlet an air/ozone conduit 34 is coupled. The air/ozone conduit includes a check valve 22. By means of this air/ozone conduit, the air/ozone mixture b is fed into the process water inlet conduit d via a feed point, designed as a Venturi nozzle 21. A feed point 21 for the air/ozone mixture b, designed as a Venturi nozzle with a non-return valve in a bypass branch, is fluidly connected to an inlet conduit 31, which is connected to the reactor 4.

Feeding is done in the bypass branch of the inlet conduit 31 for the process water. The second, outer reaction chamber 6 of the reactor 4 includes an inlet conduit for the process water d and the air/ozone mixture b already fed into it, with the inlet conduit being connected to the reactor 4. The water to be treated flows through this second reaction chamber 6 while it is exposed to the ultraviolet radiation from the UV lamp 1 having a wavelength of about 254 nanometers and is thus disinfected. The reactor 4 also contains a connected outlet conduit for the treated process water e.

A pressure sensor 7 is arranged at the inlet conduit 31. A stopcock 19 is arranged in the inlet conduit 31. Furthermore, a circulation pump 16 is arranged in the inlet conduit 31. Between the circulation pump 16 and the stopcock 19 there is arranged a filter 18 which provides filtered process water d. Treated process water e leaves the reactor through the outlet conduit 32.

The reactor is installed downstream of the filter 18 and the circulation pump 16 in the main water circuit.

Via a nozzle 21, for example a Venturi nozzle, this is fed into a bypass branch of the inlet conduit. Air is guided along the UV lamp 1 inside a quartz tube 2 and thus irradiated with UV light that has a wavelength of 185 nanometers. This UV radiation converts the oxygen contained in the air into ozone. Ozone leads to the oxidation of microorganisms and low-molecular weight organic compounds and salts present in the water. The ozone/air mixture is introduced into the water circuit in a bypass branch via a check valve and a nozzle 21, e.g. a Venturi nozzle.

In the second reaction chamber of the reactor 4, the process water d and the ozone/air mixture b fed therein are irradiated with UV light having a wavelength of 254 nanometers. This results in an oxidation of some low-molecular weight organic compounds and of dissolved gas ("micro pollutants") that are persistent, i.e. difficult to degrade, such as bound chlorine, nitrite, herbicides/pesticides, sulfur-containing organic compounds, hydrogen sulphide, pharmaceuticals, odorous substances and flavorings, the content of which is thus reduced. Furthermore, an additional deactivation of microorganisms occurs.

In order to ensure the intake capacity of the ozone/air mixture, for example in a range from about 1 liter per minute to 2 liters per minute, the ozone/air mixture b is fed into a bypass conduit of the inlet conduit for the process water via a nozzle 21 such as a Venturi nozzle. The feeding capacity of the Venturi nozzle in the bypass conduit depends on a certain pressure difference (between the outlet pressure and the inlet pressure of the Venturi system) and also on the flow rate of the water.

The prevailing operating pressure can be read on the pressure sensor 7 when the stopcock 19 in the inlet conduit for the process water is completely open at the position where the nozzle 21 is located in a bypass conduit. By closing, if needed slowly closing, the stopcock 19 the inlet pressure acting on the Venturi nozzle in the bypass is increased. This should be about 0.3 bar higher than the required outlet pressure in order to be able to feed the desired amount of the ozone/air mixture. It is advantageous to achieve an ozone/air mixture feed capacity of 1 liter per minute or more in order to sufficiently cool the UV lamp 1 and to allow efficient water treatment.

The feed capacity may for example be in the range from 1 liter per minute to 2 liters per minute. The operating pressure (or line pressure) is typically variable, as the pressure conditions in the main water conduit change inter alia due to the degree of contamination of the filter. If the operating pressure varies, it is only conditionally possible to readjust the flow through the bypass, in which the Venturi nozzle 21 is arranged, by manually closing or opening the stopcock 19.

As already explained in the foregoing, the reactor may contain a plurality of first reaction chambers arranged side by side. For example, a plurality of UV lamps may be provided, each surrounded by a quartz tube and each containing an outlet for the air/ozone mixture. An air/ozone conduit may be coupled to each of these outlets. In such embodiments, the feed capacity can refer to any of the first reaction chambers. In such embodiments, the overall feed capacity may be several times the values specified above.

FIG. 2 depicts an embodiment of the apparatus disclosed herein. The apparatus likewise has a reactor 4 with two separate reaction chambers. The first reaction chamber 5 is defined by an inner cylinder with a quartz tube 2 as the outer wall. Within the interior of the first reaction chamber 5 there is arranged a UV lamp 1. The UV lamp is arranged centrally in the reactor. The UV lamp is furthermore arranged centrally in the first reaction chamber 5. The second reaction chamber 6 is defined by an outer cylinder 2. Also in this embodiment, a UV lamp 1 is provided, which emits UV light having two different wavelengths. These are typically the wavelengths of 185 nanometers and 254 nanometers. The reactor of the apparatus has an inlet side 3 through which air a can enter the inner first reaction chamber 5. The second, outer chamber 6 of the reactor contains a water inlet connection point and a water outlet connection point. An outlet of the inner first reactor chamber 5 of the reactor is coupled to a gas conduit 34, for instance an ozone tube 34, which may contain a check valve 22. The ozone/air mixture is fed into a recirculation conduit 33 via a Venturi nozzle with a check valve.

The feed capacity may for example be in the range from 1 liter per minute to 6 liters per minute, including from 1 liter per minute to 4 liters per minute. In some embodiments the feed capacity is in the range of 2 liters per minute up to 5 liters per minute.

A pressure sensor 7 is provided in the form of a manometer, which is equipped with a transmitter respectively. There are two pressure sensors 7 on both sides of the Venturi nozzle. In the embodiment disclosed here, the recirculation conduit 33 further includes an optional flow sensor 8, which may also be provided with a transmitter. A fresh water supply feed 9 ends in the recirculation conduit 33. Furthermore, the recirculation conduit 33 contains a frequency-controlled pump 10. A control element 11 for the pump 10 is connected to the pump. A control can be carried out on the basis of the determined pressure difference. Two stopcocks 19 are provided, by means of which the flow in the inlet conduit 31 and in the recirculation conduit 33 can be controlled.

Figure 5:
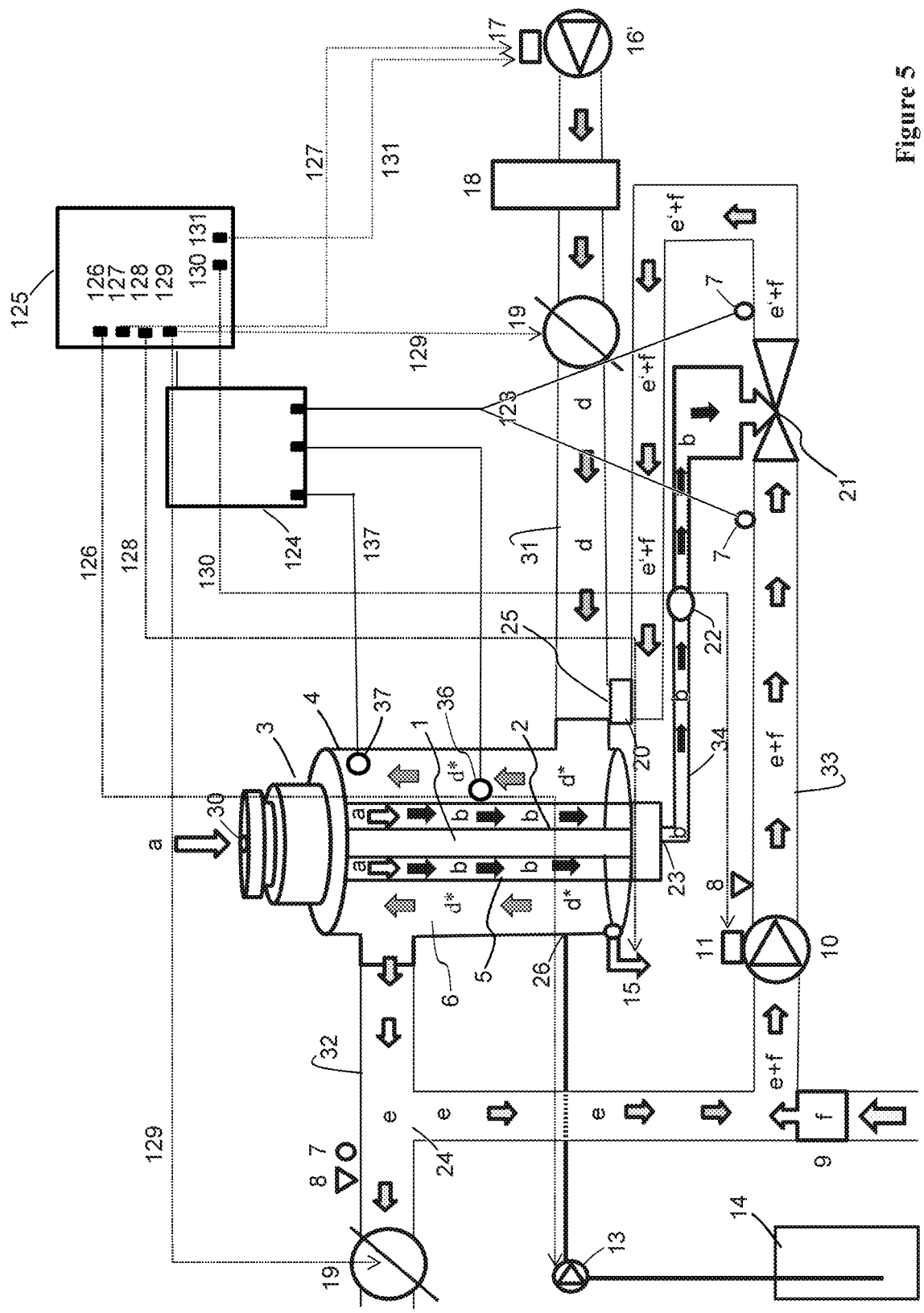
FIG. 5 depicts a control of an apparatus disclosed herein on the basis of the embodiment shown in FIG. 2.

After the reactor 4, a portion of the purified process water e is branched off in a recirculation conduit 33, and pumped by means of the frequency-controlled pump 10. The flow rate of the frequency-controlled pump 10 can be controlled on the basis of the flow rate determined by the flow sensors 8 and/or on the basis of the pressure difference between the positions of the corresponding sensors determined by means of two pressure sensors 7. This control can be carried out automatically by a control element 11. An embodiment of this control is illustrated in FIG. 5.

The speed of the pump may for example be controlled. Fresh water continues to be mixed into the cleaned process water e through the fresh water supply feed 9. The supply conduit for fresh water f is arranged upstream of the pump 10. The ozone/air mixture is fed into the mixture of fresh water and purified process water via the feed point 21, e.g. a Venturi nozzle, which may be coupled to a check valve. Immediately before the reactor 4, the water e' thus mixed with air/ozone is returned to the main water circuit, from where it is fed directly into the second reaction chamber 6. An additional non-return flap 20 prevents the process water d from flowing towards the feed point 21, which may e.g. be a Venturi nozzle.

The process water e already purified by means of the reactor, and also the fresh water f fed in, are pressed by the pump 10 in the direction of the Venturi nozzle 21 in order to be able to feed an optimal amount of air/ozone mixture b. The feed capacity of the air/ozone mixture b will be 2 to 6 liters per minute or more, depending on the application. In embodiments in which the reactor includes a plurality of first reaction chambers, the feed capacity of the air/ozone mixture b may be 2 to 6 liters per minute or more per UV lamp.

Depending on the application and the circulation capacity, 1 to 4 liters per minute of air/ozone mixture can be fed in. The air/ozone mixture b is mixed into the pre-purified water e and/or the fresh water f in very fine blebs by means of the Venturi nozzle 21 and reintroduced into the main water circuit immediately upstream of the reactor 4.

By means of the control element 11 and the pump 10, the flow through the recirculation conduit 33 and/or the differential pressure before and after feeding through the Venturi nozzle 21 is kept constant. For example, the difference between the value of the downstream pressure sensor and the value of the upstream pressure sensor 7 can be controlled to an at least substantially constant value. Such a difference may, for example, be 0.3 bar. For this purpose, the frequency of the pump 10 can be controlled continuously. Thereby, even under variable pressure conditions or even with variable circulation capacities in the main water circuit, the feed capacity of the air/ozone mixture b is automatically kept constant.

Since the treated process water e or the fresh water f contain only very few pollutants (e.g. micro-particle pollutants), most of the ozone b will not have reacted until it is mixed with the process water d to be purified. If the path from the mixing of prepurified process water e or of fresh water f and process water is selected to be short, as shown in FIG. 2, most of the ozone b will not have reacted until it reaches the second reaction chamber 6 of the reactor 4. In the second reaction chamber 6, the water e, f to which ozone b has been added, is irradiated with UV light having a wavelength of 254 nanometers by means of the UV lamp 1. The ozone, which is still largely present, reacts to an OH. radical, activating and reacting according to the Advanced Oxidation Process (see above), as it has a very high oxidation power.

The non-return flap 20 prevents the mixture of fresh water and treated water e' from reversing, so that the fresh water supply feed 9 is safely operateable at this point in the system. The degradation of low molecular weight organic compounds and salts, especially the degradation of body fluid products and humic acids, by UV treatment in chlorinated water is much more cost-intensive than the degradation of such compounds and salts in non-chlorinated water. The treatment of the fresh water f by the process disclosed herein therefore allows a very efficient and early reduction of micropollutants and thus leads to considerable cost savings.

The use of a frequency-controlled pump 10 allows a continuous and stable feed capacity of the air/ozone mixture b independent of fluctuating circulation capacities and pressure conditions in the main water circuit. A pressure increase of 0.3 bar is required for feeding the air/ozone mixture via the Venturi nozzle 21. Due to the system provided herein, such an increase in pressure is only necessary for a small partial flow in the system, but not for the entire water cycle. With the frequency-controlled pump 10 it is furthermore possible to automate the feed via the Venturi nozzle. The frequency control of the pump provides additional cost savings.

FIG. 3 depicts another embodiment of the apparatus disclosed herein. The apparatus resembles the apparatus shown in FIG. 2 and also has a reactor 4 with two separate reaction chambers. In this design, too, a part of the water is branched off from the already purified process water e in a recirculation conduit 33, and pumped back in the direction of the inlet conduit of the reactor by means of the controllable pump 10. Also in this embodiment, supplied fresh water f is supplied to the treated process water e via a feed 9. In this embodiment, the air/ozone mixture b is fed into the fresh water f via a nozzle 21, for example a Venturi nozzle.

The apparatus shown in FIG. 3 includes an air supply control element 27 arranged at the air inlet 30. This air supply control allows controlling the amount of air entering the first reaction chamber 5 of the reactor 4 via the air inlet 30. In this way, the ratio between the volume of air entering the reactor and the volume of water to be treated entering the reactor can be controlled. Thereby the ratio of the volumes of air and water to be treated can be changed in order to increase or decrease the relative amount of air/ozone mixture fed into the water to be treated. In this way, the relative amount of air/ozone mixture fed into the water to be treated can also be kept essentially constant even in the event of changes in the amounts of water flowing into the reactor.

FIG. 3 depicts, inter alia, a circulation pump 16. This circulation pump may be a controllable circulation pump such as a frequency-controlled circulation pump. It may be coupled to a control 17 for the circulation pump 16, cf. for example FIG. 2.

The embodiment shown in FIG. 4 also has a reactor, the second reaction chamber 6 of which is defined by an outer cylinder 2. This includes a water inlet connection point and a water outlet connection point, a tap 15, an inlet supply conduit for feeding chemicals and a connection for the recirculation conduit. In this embodiment, the apparatus further includes a container 14 with a dosing lance and level controller. The container 14 is coupled to the reactor 4 via a feed conduit 26 via a dosing pump 13. The second reaction chamber 6 of the reactor 4 further includes a tap 15.

A frequency-controlled circulation pump 16' is coupled to a controller 17 for the pump 16'. The control can be carried out with the aid of a flow sensor 8. A filter 18 serves in pre-cleaning the process water. With the aid of stopcocks or sliders 19, the flow can additionally be shut off. Also in this embodiment, a non-return flap 20 is provided.

Dirt and deposits on the outside of the quartz glass 2 can severely impair the efficiency of the treatment process, as this obstructs the irradiation of the UV light into the second reaction chamber 6. Chemicals such as hydrochloric acid and citric acid can remove these deposits and dirt from the surface. The embodiment shown in FIG. 4 includes elements for this purpose. For cleaning the quartz glass, first the two stopcocks 19 are closed to allow an internal closed circuit with the pump 10. In order to clean the quartz glass, an appropriate amount of liquid chemicals has to be metered into the reaction chamber in order to be circulated by means of the pump 10 for a certain amount of time. In advance, the same amount of liquid is therefore drained via the tap 15. Subsequently, the desired amount of liquid chemicals is fed into the second, outer reaction chamber 6 of the reactor 4 from the container 14 by means of the dosing pump 13, and circulated in the internal closed circuit by means of the pump 10 for a specific period of time. After the cleaning process has been completed, all the liquid is drained through the tap 15. The stopcocks 19 are opened again and normal operation of the apparatus can resume.

For some water treatment processes, e.g. for process water of industry, it may be useful to additionally dose hydrogen peroxide into the second, outer reaction chamber 6. Hydrogen peroxide may be introduced into the container 14 for this purpose. The hydrogen peroxide is fed into the second reaction chamber 6 of the reactor by means of the dosing pump 13. The hydrogen peroxide is mixed there with the process water and ozone as well as OH. radicals already present, and additionally irradiated with UV light (254 nanometers). This optimizes the Advanced Oxidation Process (AOP).

An embodiment according to FIG. 4 allows easy and automatic maintenance of the apparatus without much labor.

In some embodiments of a process and apparatus disclosed herein, the treated, purified water may be collected and completely re-fed into the reactor of the apparatus. In some embodiments, an apparatus disclosed herein may be used repetitively by using already treated water instead of process water.

The individual system components and device variants of this apparatus were tested in detail during the 7P EU research project "demEAUmed". Further information can be found on the project's own website: www.demeaumed.eu.

FIG. 5 schematically illustrates a control of an embodiment depicted in FIG. 2, which may be automated. Various measured values are determined for the control and fed to a measuring element 124, and made available to the control element 125.

In regular operation, the minimum UV dosage in the second reaction chamber is monitored, measured by means of a UV sensor 36. If the UV dosage is less than 90% but higher than 70% of the target value, the frequency-controlled circulation pump 16' is throttled via the frequency control element 131. However, if the UV dosage falls below 70% of the target value, the frequency-controlled circulation pump 16' and additionally the frequency-controlled pump 10 are switched off via the frequency control element 131. The measuring element 124 may then give an alarm signal.

The temperature in the second reaction chamber is also monitored by means of a temperature sensor 37. In case the maximum temperature (e.g. at 40° C.) in the second reaction-chamber is reached or exceeded, the circulation pump 16 is turned off via a switching relay 127 and, in addition, the frequency-controlled pump 10 is turned off. In this case too, the measuring element 124 may emit an alarm signal.

Finally, the pressure difference is monitored and stabilized to about 0.3 bar by means of two pressure sensors 7. For this purpose, the frequency control element 11 of the pump 10 is addressed via the control element 130, so that frequency control is carried out.

An automatic supply of liquid chemicals such as hydrochloric acid may be carried out via the time control element 126 and the dosing pump 13.

For reactor cleaning, the two stopcocks are automatically closed via the control element 129. Subsequently, both the pump 10 and the circulation pump 16 are turned off via the control element 131. Thereafter the tap 15 is opened for a limited period of time and then closed again via the control element 128 in order to drain a certain amount of water. Via the control element 126, a certain amount of chemicals in fluid form is then pumped into the reactor by means of the dosing pump 13. Subsequently, the pump 10 is turned on via the control element 130 by means of the frequency control element 11, in order to activate a resulting internal water circuit. After a predetermined period of time, the pump 10 is turned off again via the control element 130 by means of the frequency control element 11. Then the tap 15 is opened and closed again for a limited period of time via the control element 128 so as to drain a certain amount of water. The apparatus can subsequently again be run in standard operation.

For filter backwashing, a power supply to the apparatus is interrupted for a certain period of time, and the apparatus is restarted after completion of the flushing process.

Figure 6:
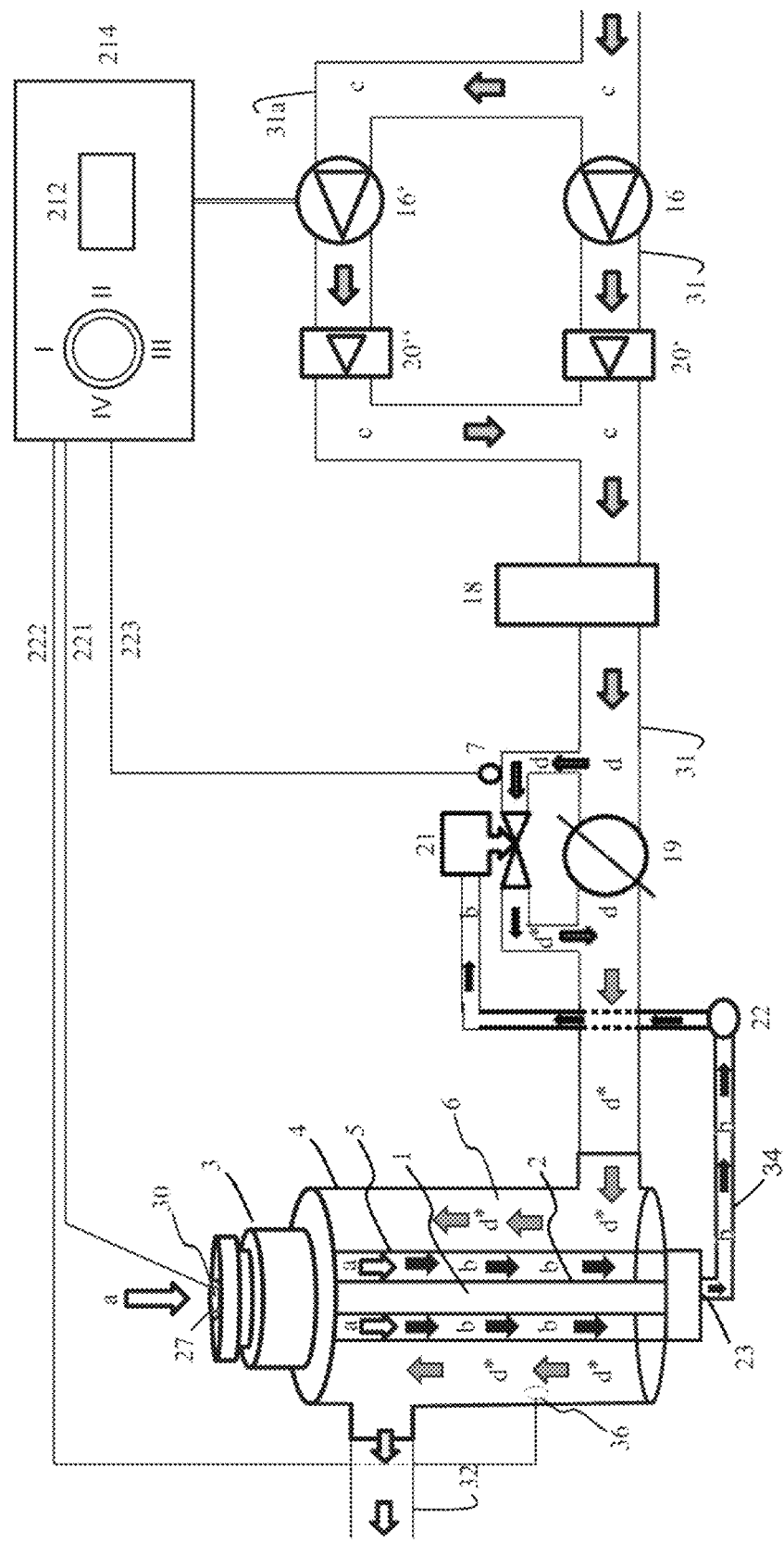
FIG. 6 depicts the apparatus in an embodiment with a control element 214.
Figure 7:
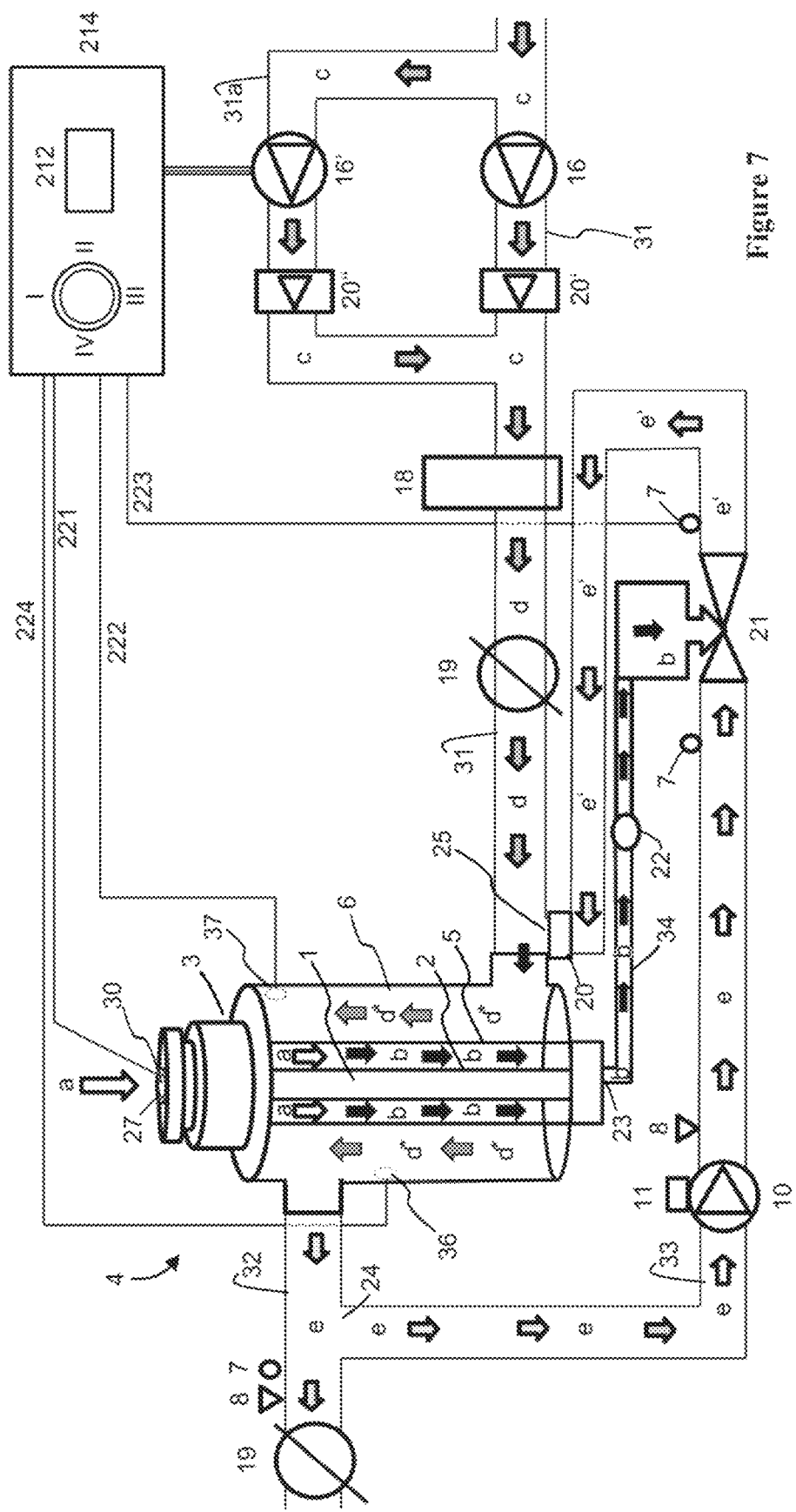
FIG. 7 depicts the apparatus in a further embodiment with a control element 214.

FIGS. 6 and 7 depict further embodiments of the apparatus disclosed herein. In these embodiments, the apparatus includes an additional, second controllable circulation pump 16'. This second, controllable circulation pump 16' is arranged in a bypass branch 31*a* of the inlet conduit 31. The first circulation pump 16 is arranged in the inlet conduit 31. As a result, both circulating pumps are connected in parallel. A first check valve 20' is arranged in the bypass branch 31*a* between the second, controllable circulation pump 16' and the water filter 18. A second check valve 20" is also arranged in the inlet conduit 31 between the first circulation pump 16 and the water filter 18.

The apparatus shown in FIGS. 6 and 7 also includes an air supply control element 27. By means of this air supply controller the volume of air per time unit it is controllable, for example the number of liters of air received by the first reaction chamber 5 per minute. The more air there is introduced into the reactor, the more ozone is formed in the first reaction chamber 5. In case of changes in the volume of water that is introduced into the reactor through the inlet conduit per unit of time, such as changes in the liters of water per second, it may be advantageous to accordingly adjust the amount of air/ozone mixture fed into the water entering the reactor. This can be done by means of the air supply control element 27.

The apparatus shown in FIG. 7 also includes a temperature sensor 37 in the second reaction chamber 6. By means of the temperature sensor it can be determined whether the volume of water that is introduced into the reactor through the inlet conduit per unit time, changes or remains constant. If the volume of water introduced into the reactor through the inlet conduit per unit of time decreases, the water remains longer in the reactor and is therefore exposed to UV radiation for a longer period of time. The water heats up more strongly, which can be detected by the temperature sensor 37. It protects the apparatus from overheating.

The apparatus shown in FIGS. 6 and 7 also includes a UV sensor 36 in the second reaction chamber. By means of the UV sensor, it can be monitored whether the minimum irradiation of UV light (254 nm) required for the application, and thus the minimum UV dosage in mJ/cm$^2$ in the second reaction chamber is always ensured.

EXAMPLES

An apparatus disclosed herein has been tested for its effect on microorganisms and disinfection byproducts in two differently sized embodiments with a single UV lamp and a maximum water flow of 76 m$^3$/h and 5 m$^3$/h. The measuring arrangement is shown in FIG. 7.

An apparatus disclosed herein has been tested for the inactivation of *E. coli, Bacillus subtilis* spores and MS2 phage in one-way operation, i.e. without multiple treatment using the apparatus disclosed herein. *Bacillus subtilis* spores (ATCC 6633) were incubated at 37° C. for 44±2 h on Columbia Blood Agar Base before use. *Bacillus subtilis* spores (ATCC 6633) were incubated at 37° C. for 44±2 h on Columbia Blood Agar Base before use.

Figures 8A, 8B, 9A:
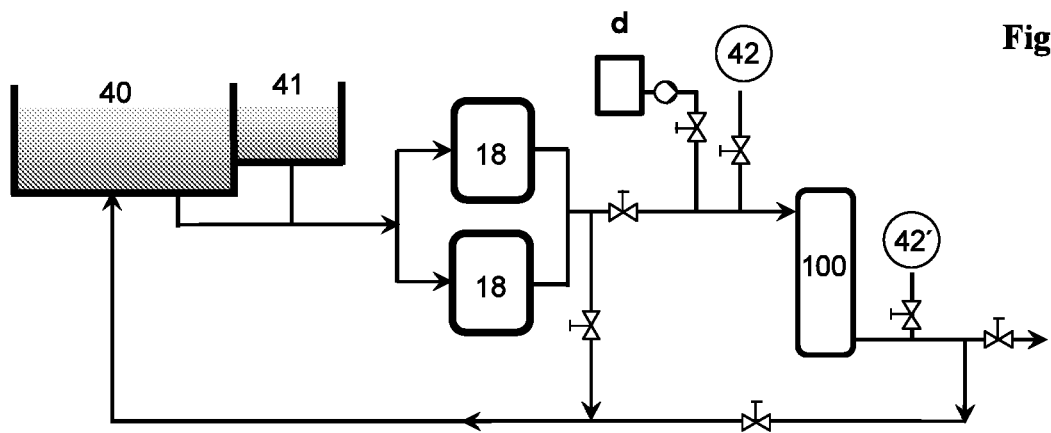

Experiments were carried out at flow rates of 76, 40 and 20 m$^3$/h. Tap water with 12±1° C. and a pH of 8.3±0.1 was used as the water. As shown in FIG. 8, no *E. coli* was detectable at all tested UV doses. From FIGS. 9A and 9B it can be taken that all UV doses were used to kill *B. subtilis* spores at a comparable rate. FIGS. 10A and 10B show that simple UV irradiation is less effective when compared to an apparatus disclosed herein.

It should be understood that the foregoing description is intended to illustrate, and not to limit, the scope of the invention, which is defined by the scope of the ensuing claims. Other embodiments are within the appending claims.

The invention has been described broadly and generically herein. Each of the narrower species and subgeneric groupings falling within the generic disclosure also form part of the apparatus. This includes the generic description of the apparatus with a proviso or negative limitation removing any subject matter from the genus, regardless of whether or not the excised material is specifically recited herein.

Other embodiments are within the appending claims. Where features or aspects of the invention are described in terms of Markush groups, those skilled in the art will recognize that the invention is also thereby described in terms of any individual member or subgroup of members of the Markush group.

LIST OF REFERENCE SIGNS (1) UV lamp
(2) quartz tube
(3) air inlet side
(4) reactor
(5) first, inner reaction chamber
(6) second, outer reaction chamber
(7) pressure sensor
(8) flow sensor
(9) fresh water supply feed
(10) pump
(11) control element for pump (10)
(12) stopcock
(13) dosing pump
(14) container
(15) tap
(16) circulation pump
(16') controllable circulation pump
(17) controller for controllable pump (16')
(18) filter
(19) stopcock/slide valve
(20) non-return flap
(20') non-return valve
(21) feed point/nozzle
(22) check valve
(23) gas outlet
(24) connection of the recirculation conduit to the outlet conduit (32)
(25) connection of the recirculation conduit to the inlet conduit (31)
(26) inlet for conduits for chemicals
(27) air supply control element
(30) air inlet
(31) inlet conduit
(31a) bypass inlet conduit
(32) outlet conduit
(33) recirculation conduit
(34) gas conduit
(35) fresh water conduit
(36) UV sensor
(37) temperature sensor
(40) swimming pool
(41) swimming pool for children
(42) sampling on the inlet side
(42') sampling on the outlet side
(100) apparatus with recirculation conduit (33), gas conduit (34) and feed point (21) according to FIG. 2
(124) measurement element
(125) control element
(126) control element of dosing pump (13)
(127) switching relay
(128) control element for tap (15)
(129) control element for stopcock (12)
(130) control element for frequency controller (11) of pump (10)
(131) control element of the pump (10) and the circulation pump (16)
(212) display
(214) control element
(221) air supply control
(222) temperature data transmission
(223) transmission of print data
(224) UV intensity data transmission
(I) position "off"
(II) position "reactor cleaning"
(III) "night mode" position
(IV) position "backwash filter"
a air
b air/ozone mixture
c unfiltered process water
d filtered/process water
d* filtered process water/process water mixed with air/ozone
e treated process water
e' treated process water mixed with air/ozone
f fresh water
f fresh water mixed with air/ozone
g Feed of chemicals, e.g. hydrogen peroxide or hydrochloric acid or citric acid

What is claimed is:

1. A water treatment apparatus comprising:
(i) a reactor (4) comprising a first (5) and a second (6) reaction chamber;
(ii) an inlet conduit (31) for process water (d, d*); and
(iii) an outlet conduit (32) for treated water (e),
wherein the first reaction chamber (5) of the reactor (4) comprises a UV lamp (1), an air inlet (30) and a gas outlet (23) for an air/ozone mixture (b), and wherein the first reaction chamber is capable of allowing passage of air through said first reaction chamber while said air is exposable to ultraviolet radiation of the UV lamp (1) to form ozone,
wherein said inlet conduit (31) and said outlet conduit (32) are connected to the second reaction chamber (6) of the reactor (4), and wherein the second reaction chamber (6) is capable of allowing passage of water to be treated while said water is exposable to the ultraviolet radiation of the UV lamp (1),
wherein an air/ozone conduit (34) is connected to the gas outlet (23) for the air/ozone mixture (b), via which the air/ozone mixture (b) is feedable into the inlet conduit (31) for the water to be treated (d, d*), and
wherein the inlet conduit (31) is configured for allowing coupling thereof to a water filter (18) and a circulation pump (16) such that the water filter (18) is arranged between the circulation pump (16) and the reactor (4), and wherein the circulation pump (16) is configured to pump water in the direction of the reactor,
wherein a recirculation conduit (33) extends from the outlet conduit (32) to the inlet conduit (31) and is provided for partially recirculating the treated water (e) from the outlet conduit (32) into the inlet conduit (31), the recirculation conduit (33) comprising a pump (10) configured to pump water toward the inlet conduit (31), and
(i) comprises a feed point (21) at which the air/ozone mixture (b) is feedable into the process water (d); or
(ii) is in fluid communication with a fresh water conduit (35) via a fresh water feed point (9), the fresh water conduit (35) comprising a feed point (21) at which the air/ozone mixture (b) is feedable into fresh water (f) in the fresh water conduit (35).

2. The water treatment apparatus according to claim 1, wherein the inlet conduit (31) comprises the water filter (18) and the circulation pump (16), the circulation pump (16) being configured to pump water in the direction of the reactor, and wherein the water filter (18) is arranged between the circulation pump (16) and the reactor (4).

3. A process for treating process water (d) with ozone and ultraviolet radiation by means of the apparatus according to claim 2, wherein the method comprises:
pumping process water (d) into the reactor (4) via the inlet conduit (31) by means of a circulation pump (16);
allowing air to flow through the first reaction chamber of the reactor (4) and in the meantime exposing the air to ultraviolet radiation from the UV lamp (1) so as to form ozone;
feeding the resulting air-ozone mixture (b) into the process water (d);
allowing the process water (d) to flow through the second reaction chamber (2) of the reactor (4) and in the meantime it to the ultraviolet radiation of the UV lamp (1),
wherein the process further comprises:
recirculating the treated water (e) partially into the process water (d) via the recirculation conduit (33), feeding the air/ozone mixture (b) into the recirculated water via the feed point (21) and increasing the pressure in the recirculated water by means of the pump (10).

4. The water treatment apparatus according to claim 1, wherein the circulation pump (16) is a controllable circulation pump (16').

5. The water treatment apparatus according to claim 4, wherein the controllable circulation pump (16') is a frequency-controlled circulation pump.

6. The water treatment apparatus according to claim 5, wherein the frequency-controlled circulation pump (16') is coupled to a controller (17).

7. The water treatment apparatus according to claim 1, further comprising a second circulation pump, wherein the second circulation pump is a controllable circulation pump (16') which is connected in parallel with the circulation pump (16) and which is configured for pumping water in the direction of the reactor, and wherein the second controllable circulation pump (16') is arranged upstream of the water filter (18), in a bypass branch (31a) of the inlet conduit (31) and wherein a first non-return valve (20') is arranged between the circulation pump (16) and the water filter (18) and a second non-return valve (20") is arranged between the second, controllable circulation pump (16') and the water filter (18).

8. A process of continuously treating process water (d), the process comprising:
pumping process water (d) via the inlet conduit (31) of the water treatment apparatus according to claim 7 into the reactor (4) of the water treatment apparatus by means of a circulation pump (16);
in the first reaction chamber of the reactor (4) of the water treatment apparatus, exposing air passing there through to the ultraviolet radiation of the UV lamp (1) to term ozone;
in the second reaction chamber (2) of the reactor (4), exposing process water (d), which is flowing there through and enriched with an air/ozone mixture, to the ultraviolet radiation of the UV lamp (1); and
a) partial recirculating of the treated water (e) via the recirculation conduit (33) into the process water (d) and feeding of the resulting air/ozone mixture (b) into the recirculated treated water (e),
wherein feeding the air-ozone mixture (b) into the recirculated water (e) via the feed point (21) is carried out before the recirculated water (e) is fed into the process water (d), and wherein the pressure of the recirculated water (e) is increased by means of the pump (10); or
b) continuing pumping process water (d) into the reactor (4) by means of the second, controllable circulation pump (16') connected in parallel with the circulation pump (16) via the bypass branch (31a) and the inlet conduit (31).

9. The process of claim 8, comprising:
a) partial recirculating of the treated water (e) via the recirculation conduit (33) into the process water (d) and feeding of the resulting air/ozone mixture (b) into the recirculated treated water (e),
wherein feeding the air/ozone mixture (b) into the recirculated water (e) via the feed point (21) is carried out before the recirculated water (e) is fed into the process water (d), and wherein the pressure of the recirculated water (e) is increased by means of the pump (10); and
b) continuing pumping process water (d) into the reactor (4) by means of the second, controllable circulation pump (16') connected in parallel with the circulation pump (16) via the bypass branch (31a) and the inlet conduit (31).

10. The water treatment apparatus according to claim 1, wherein the recirculation conduit (33) comprises a feed point (21) at which the air/ozone mixture (b) is feedable into the process water (d), and the pump (10) is arranged between the connection (24) of the recirculation conduit to the outlet conduit (32) and the feed point (21) for the air/ozone mixture (b), or
wherein the recirculation conduit (33) is in fluid connection with a fresh water conduit (35) via a fresh water feed point (9), the fresh water conduit (35) comprising a feed point (21) at which the air/ozone mixture (b) is feedable into the fresh water (f), and wherein the pump (10) is arranged between the connection (24) of the recirculation conduit to the outlet conduit (32) and the fresh water feed point (9).

11. The water treatment apparatus according to claim 1, wherein a feed point (21) for the air/ozone mixture (b) is designed as a Venturi nozzle.

12. The water treatment apparatus according to claim 1, wherein the recirculation conduit (33) is connected to the inlet conduit (31) via a connection (25), the connection (25) being defined by one of a non-return valve (20) and a non-return flap.

13. The water treatment apparatus according to claim 1, wherein at least one of the inlet conduit (31) and the recirculation conduit (33) comprise(s) a pressure sensor (7) or wherein the second reaction chamber (6) comprises a temperature sensor (37) and wherein the circulation pump (16) is controllable by means of the values that are outputable by at least one of the pressure sensor (7) and the temperature sensor (37).

14. The water treatment apparatus according to claim 13, wherein at least one of the inlet conduit (31) and the recirculation conduit (33) comprise(s) a pressure sensor (7) and wherein the second reaction chamber (6) comprises a temperature sensor (37) and wherein the controllable circulation pump (16) is controllable by means of the values that are outputable by at least one of the pressure sensor (7) and the temperature sensor (37).

15. The water treatment apparatus according to claim 1, wherein the recirculation conduit (33) is connected to the inlet conduit (31) via a connection (25), and the water filter (18) is arranged in the inlet conduit (31) upstream of the connection.

16. The water treatment apparatus according to claim 1, wherein the reactor (4) further comprises an inlet for a conduit (26) for supplying chemicals such as $H_2O_2$, hydrochloric acid, citric acid or the like from a container (14) with a metering pump (13).

17. The water treatment apparatus according to claim 1, wherein the air inlet (30) of the first reaction chamber (5) is controllable, wherein the air inlet (30) is optionally coupled to an air supply controller (27).

18. The water treatment apparatus according to claim 1, wherein the pump (10) is frequency-controllable in such a way that the suction power for the air/ozone mixture (b) is constant or
   wherein the air inlet (30) of the first reaction chamber (5) is controllable such that the intake power for air is adaptable to the flow rate of water through the second reaction chamber (6) of the reactor.

19. The water treatment apparatus according to claim 18, wherein the pump (10) is frequency-controllable in such a way that the suction power for the air/ozone mixture (b) is constant and
   wherein the air inlet (30) of the first reaction chamber (S) is controllable such that the intake power for air is adaptable to the flow rate of water through the second reaction chamber (6) of the reactor.

20. The water treatment apparatus according to claim 1, wherein the recirculation conduit (33)
   (i) has a feed point (21) at which the air/ozone mixture (b) is feedable into the process water (d); and
   (ii) is in fluid communication with a fresh water conduit (35) via a fresh water feed point (9), the fresh water conduit (35) having a feed point (21) at which the air/ozone mixture (b) is feedable into fresh water (f) in the fresh water conduit (35).

\* \* \* \* \*